United States Patent [19]
Young et al.

[11] Patent Number: 5,491,978
[45] Date of Patent: Feb. 20, 1996

[54] ELECTRONICALLY COMMUTATED MOTOR FOR DRIVING A COMPRESSOR

[75] Inventors: Glen C. Young; James R. Kiefer, both of Fort Wayne, Ind.

[73] Assignee: General Electric Company, Fort Wayne, Ind.

[21] Appl. No.: 388,720

[22] Filed: Feb. 14, 1995

Related U.S. Application Data

[62] Division of Ser. No. 108,328, Aug. 18, 1993, Pat. No. 5,423,192.

[51] Int. Cl.⁶ .............................. F25B 49/02; H02H 7/00
[52] U.S. Cl. .................. 62/126; 62/158; 62/230; 361/22; 361/29
[58] Field of Search .................. 62/228.1, 228.4, 62/230, 158, 157, 231, 126, 127, 129; 361/22, 24, 28, 29, 30, 31, 32, 33, 34, 51; 388/903

[56] References Cited

U.S. PATENT DOCUMENTS

| | | | |
|---|---|---|---|
| 3,946,574 | 3/1976 | Portera | 62/158 |
| 4,015,182 | 3/1977 | Erdman | 318/334 |
| 4,250,544 | 2/1981 | Alley | 364/110 |
| 4,346,434 | 8/1982 | Morinaga | 364/183 |
| 4,390,826 | 6/1983 | Erdman et al. | 318/439 |
| 4,415,844 | 11/1983 | Mendenhall et al. | 318/254 |
| 4,459,519 | 7/1984 | Erdman | 318/254 |
| 4,495,450 | 1/1985 | Tokizaki et al. | 318/138 |
| 4,500,821 | 2/1985 | Bitting et al. | 318/254 |
| 4,540,921 | 9/1985 | Boyd, Jr. et al. | 318/254 |
| 4,636,936 | 1/1987 | Boyd, Jr. et al. | 364/148 |
| 4,642,536 | 2/1987 | Boyd, Jr. et al. | 318/254 |
| 4,642,537 | 2/1987 | Young | 318/254 |
| 4,648,551 | 3/1987 | Thompson et al. | 236/49 |
| 4,667,480 | 5/1987 | Bessler | 62/180 |
| 4,688,547 | 8/1987 | Ballard et al. | 126/116 A |
| 4,712,050 | 12/1987 | Nagasawa et al. | 318/254 |
| 4,722,018 | 1/1988 | Pohl | 361/22 |
| 4,722,019 | 1/1988 | Pohl | 361/29 X |
| 4,743,815 | 5/1988 | Gee et al. | 38/254 |
| 4,752,724 | 6/1988 | Radziwill et al. | 318/254 |
| 4,757,241 | 7/1988 | Young | 318/254 |
| 4,806,839 | 2/1989 | Nagato et al. | 318/798 |
| 4,860,231 | 8/1989 | Ballard et al. | 364/571 |
| 4,868,467 | 9/1989 | Davis | 318/254 |

(List continued on next page.)

FOREIGN PATENT DOCUMENTS

87/03433  4/1987  WIPO.

OTHER PUBLICATIONS

Soviet Patent Abstracts, S–X sections, week 8945, Dec. 20, 1989.

*Primary Examiner*—Harry B. Tanner
*Attorney, Agent, or Firm*—Ralph E. Krisher, Jr.

[57] ABSTRACT

A system which drives a compressor of a refrigeration system at one or more speeds. The system includes a motor having a stationary assembly and a rotatable assembly. The stationary assembly includes windings adapted to be commutated in at least one preselected sequence. The rotatable assembly is in magnetic coupling relation to the stationary assembly and in driving relation to the compressor. The motor drives the compressor at a desired speed corresponding to a speed select signal representative of one of the speeds. The system further includes an application specific integrated circuit (ASIC) connected to the motor. The ASIC receives the speed select signal and is responsive to it for generating a commutation reference signal. The commutation reference signal in combination with the commutation signal generates a peak current demand signal and thereby cause the motor to operate at the desired speed. The ASIC includes a fault detector for detecting overcurrent, underspeed and/or undervoltage conditions of the motor and a protective circuit for disabling the motor when at least one of the conditions is detected. An inhibitor circuit prevents disablement of the motor during a period of time immediately following starting of the motor and a reset circuit resets the detector after another period of time to permit enablement of the motor after disablement thereof. The ASIC further includes a timer for timing the periods of time.

21 Claims, 17 Drawing Sheets

U.S. PATENT DOCUMENTS

| | | | |
|---|---|---|---|
| 4,876,491 | 10/1989 | Squires et al. | 318/138 |
| 4,879,502 | 11/1989 | Endo et al. | 318/723 |
| 4,912,936 | 4/1990 | Denpou | 62/230 X |
| 4,939,909 | 7/1990 | Tsuchiyama et al. | 62/126 X |
| 4,950,918 | 8/1990 | O'Breartuin et al. | 307/242 |
| 4,958,269 | 9/1990 | Gritter | 364/153 |
| 5,045,988 | 9/1991 | Gritter et al. | 363/37 X |
| 5,233,275 | 8/1993 | Danino | 318/254 |
| 5,254,926 | 10/1993 | Miller et al. | 318/801 X |
| 5,259,211 | 11/1993 | Ikeda | 62/288.4 |
| 5,282,723 | 2/1994 | Bellomo | 417/45 |
| 5,285,029 | 2/1994 | Araki | 363/98 X |
| 5,287,045 | 2/1994 | Uehara | 388/907.5 X |

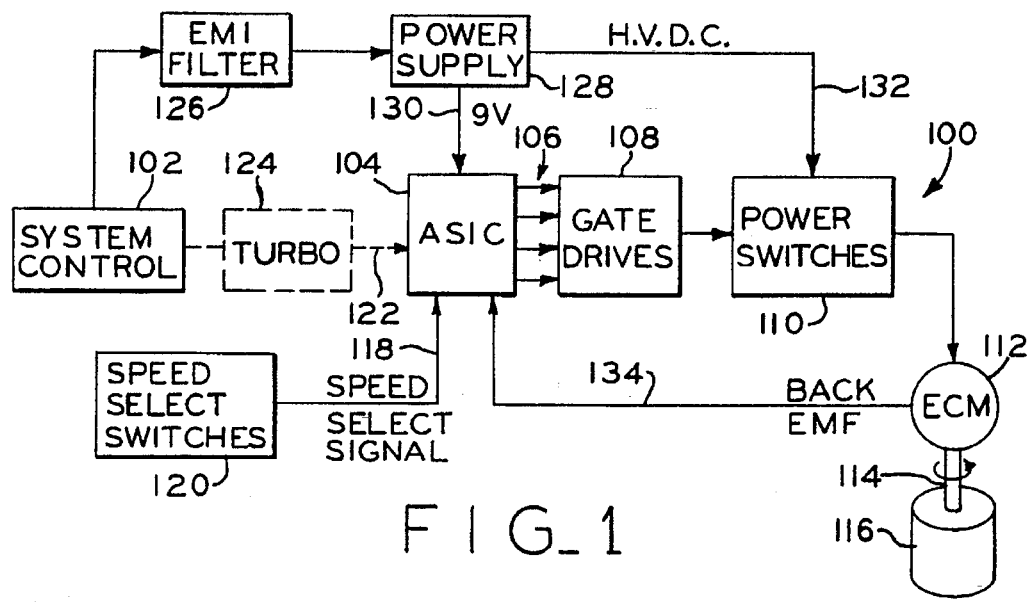
FIG_1
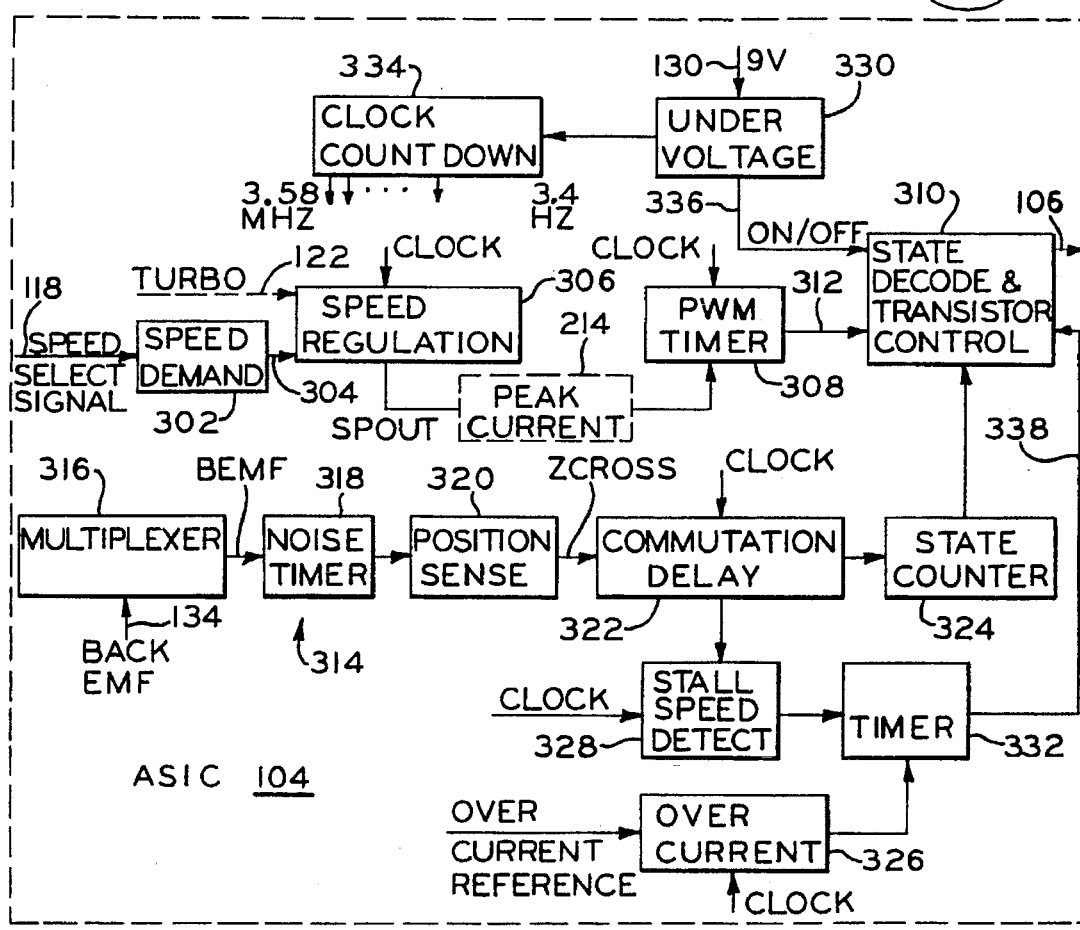
FIG_3

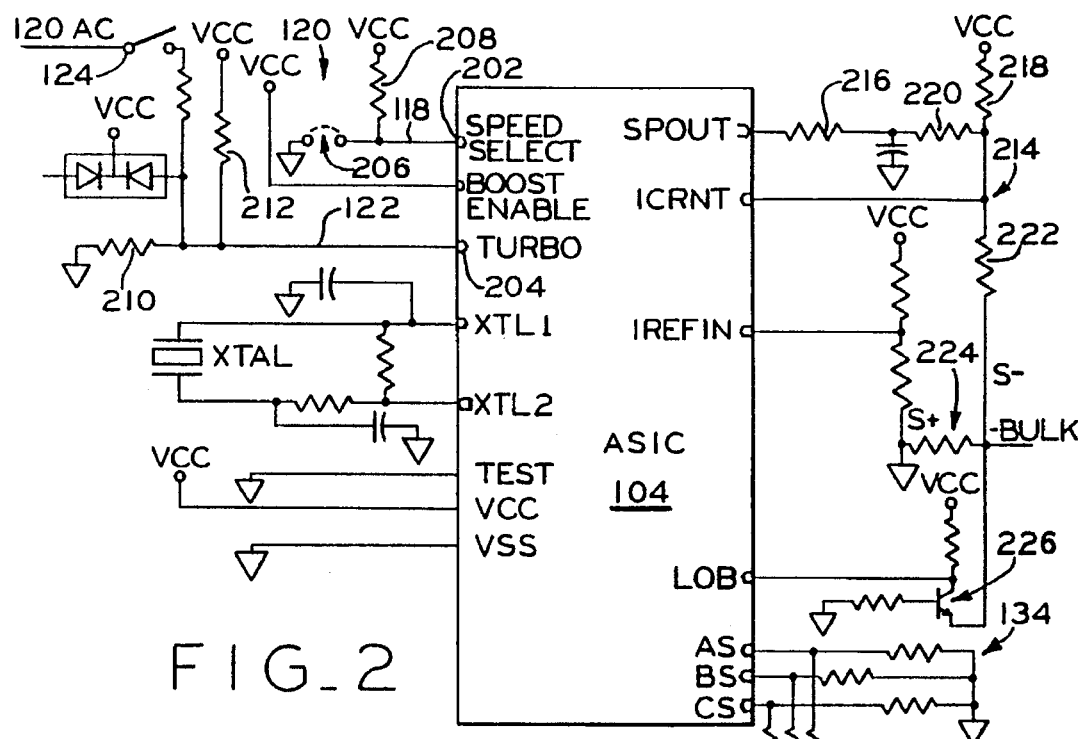
FIG_2
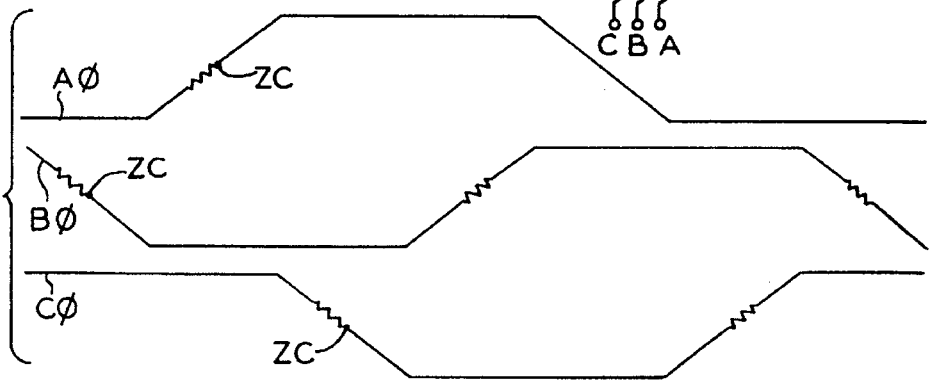
FIG_4A BACK EMF
FIG_4B MULTIPLEXED BACK EMF
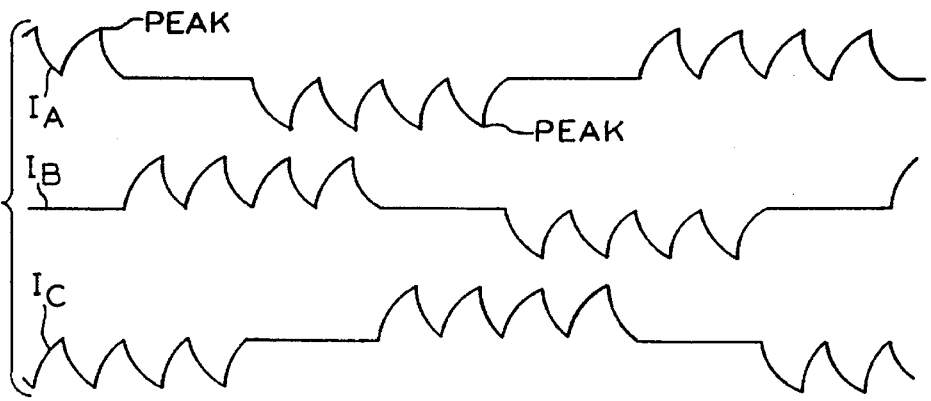
FIG_4C

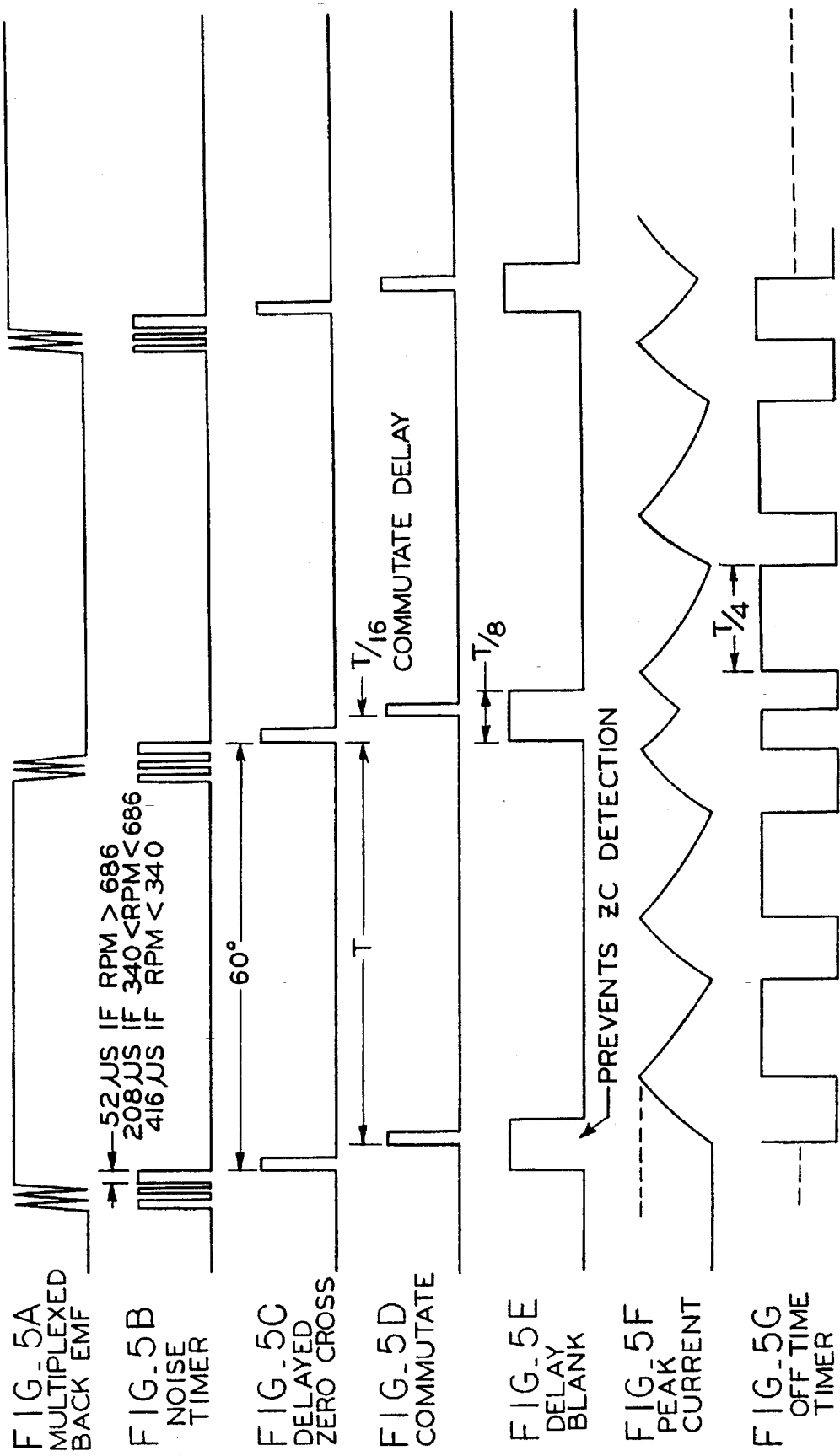

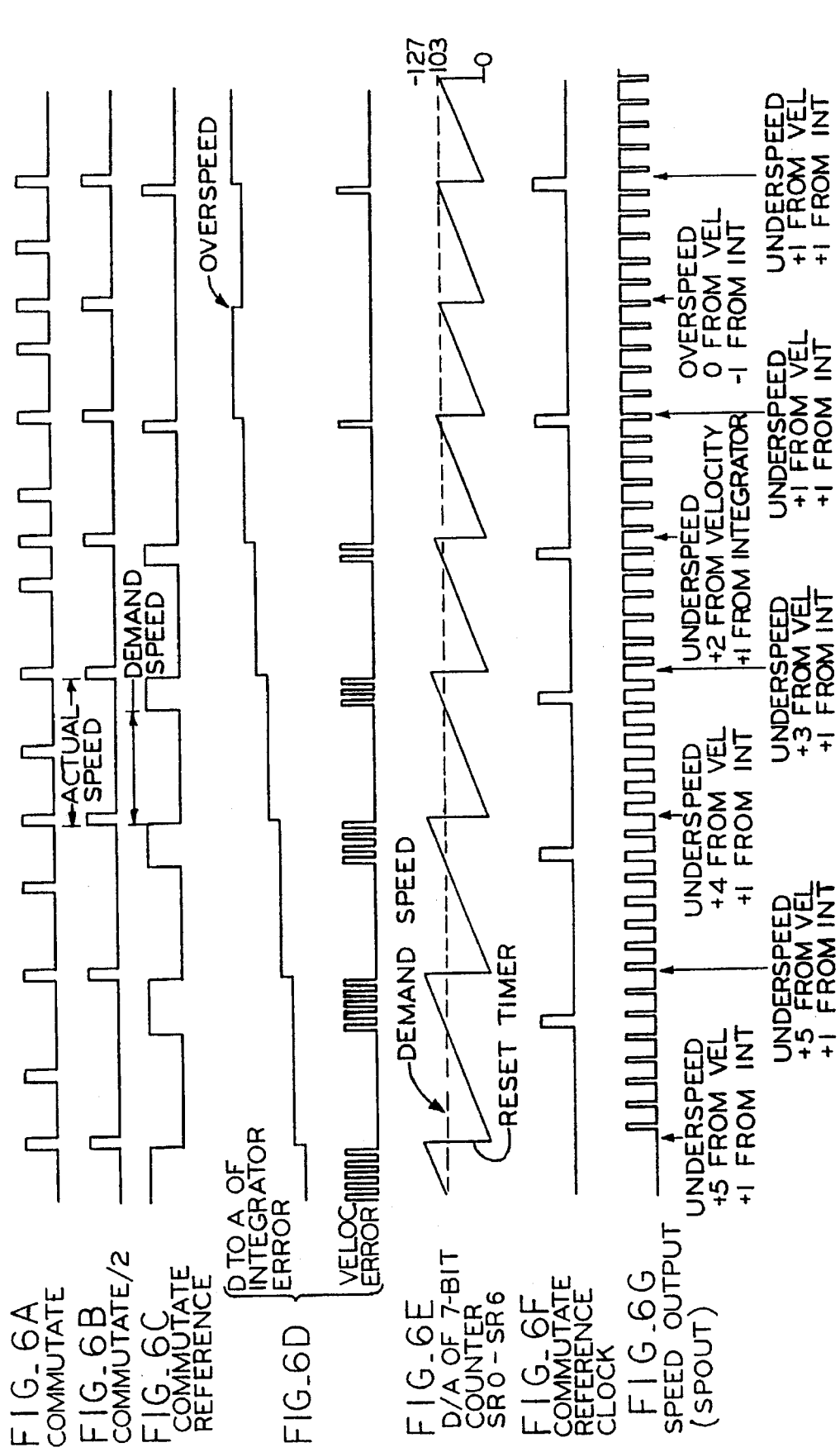

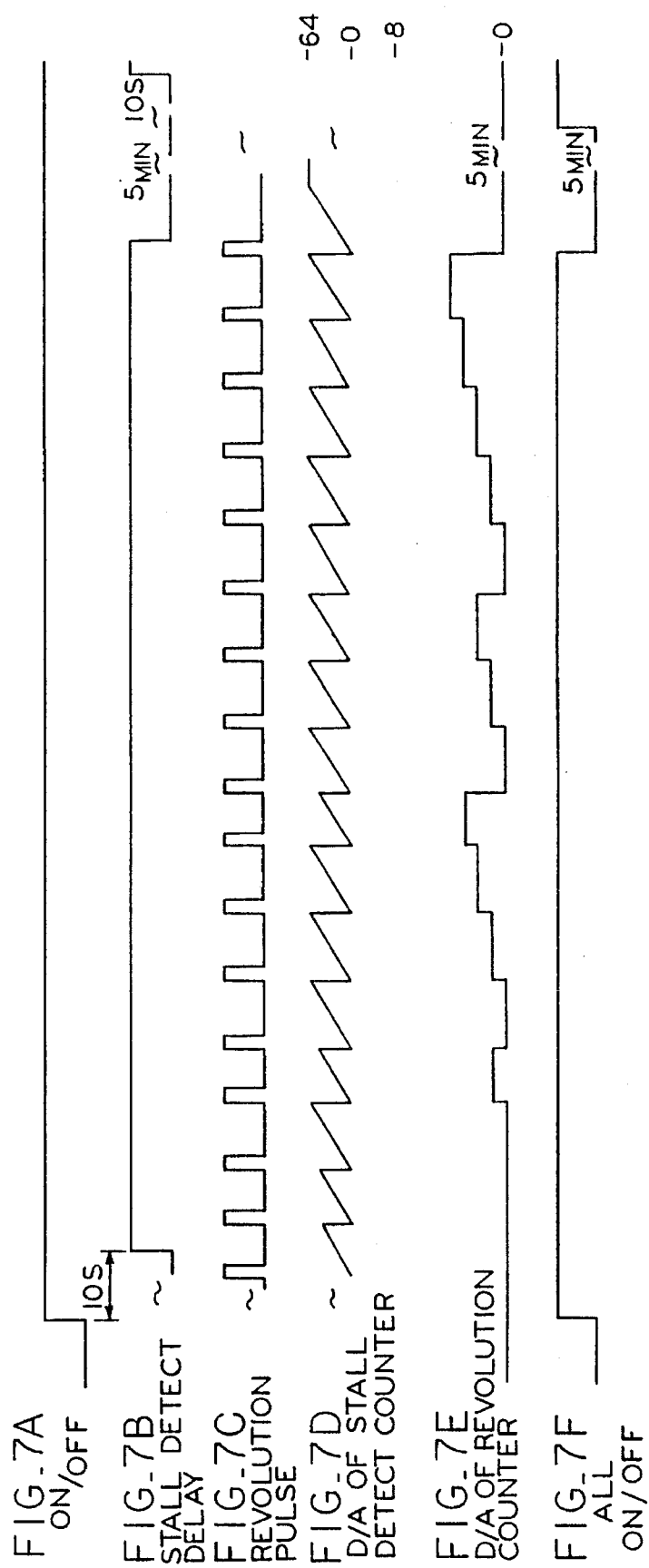

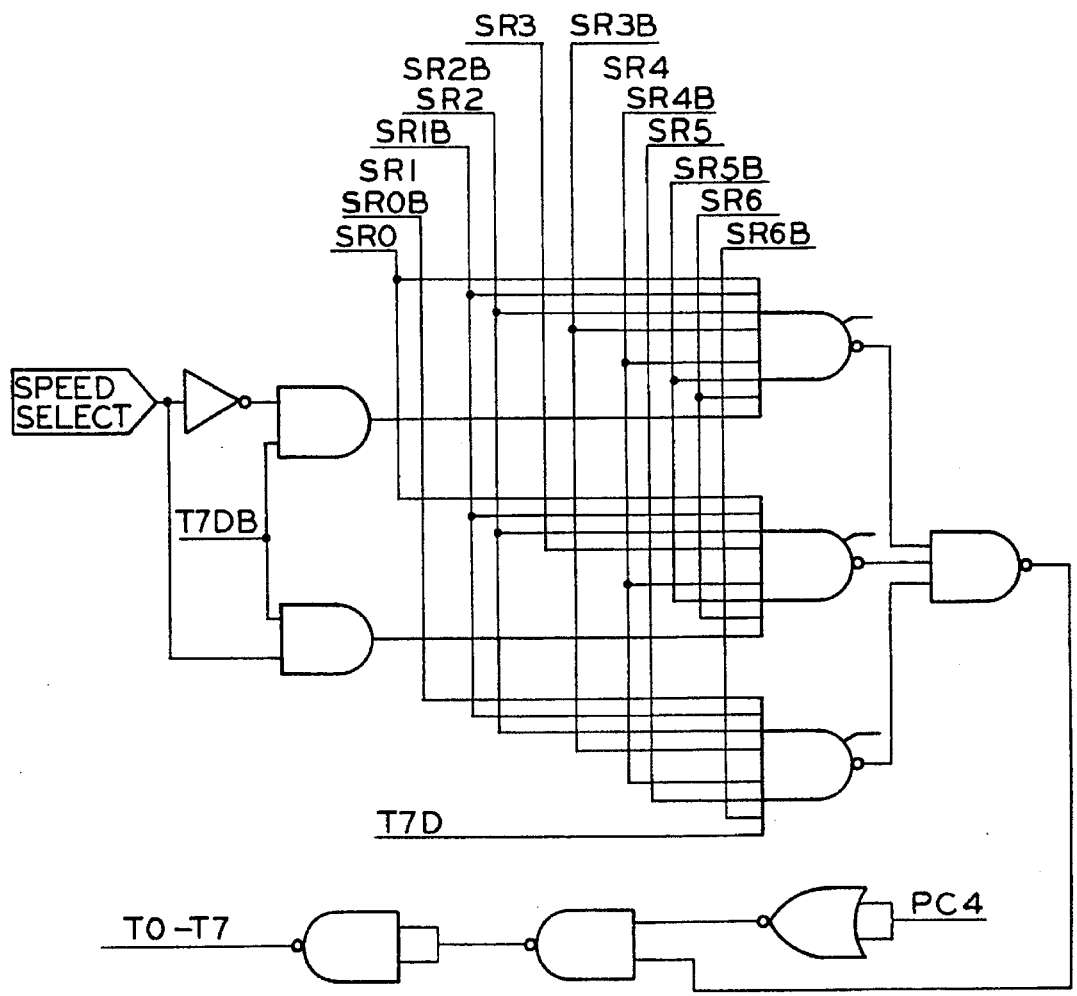
FIG_8C
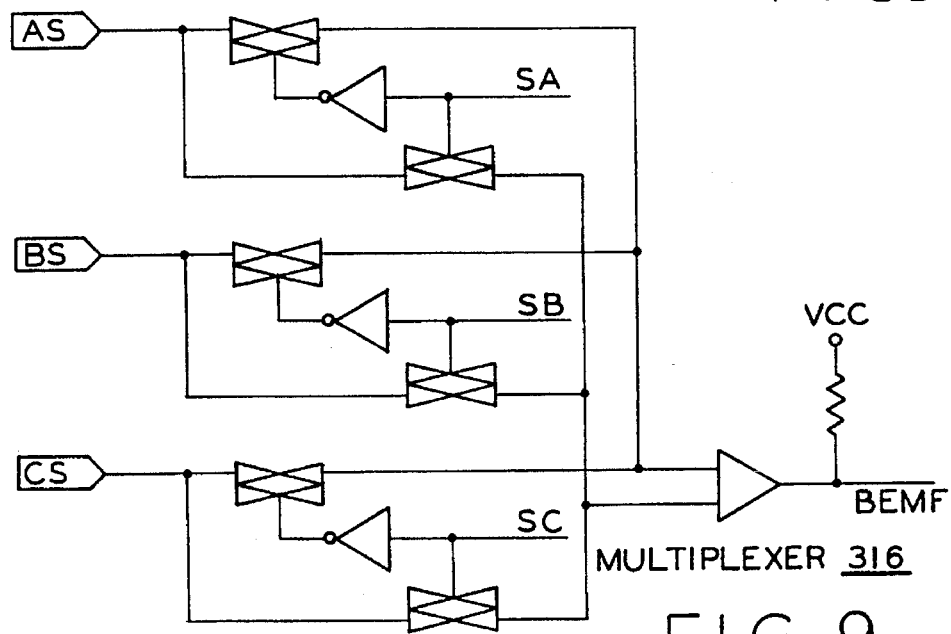
FIG_9

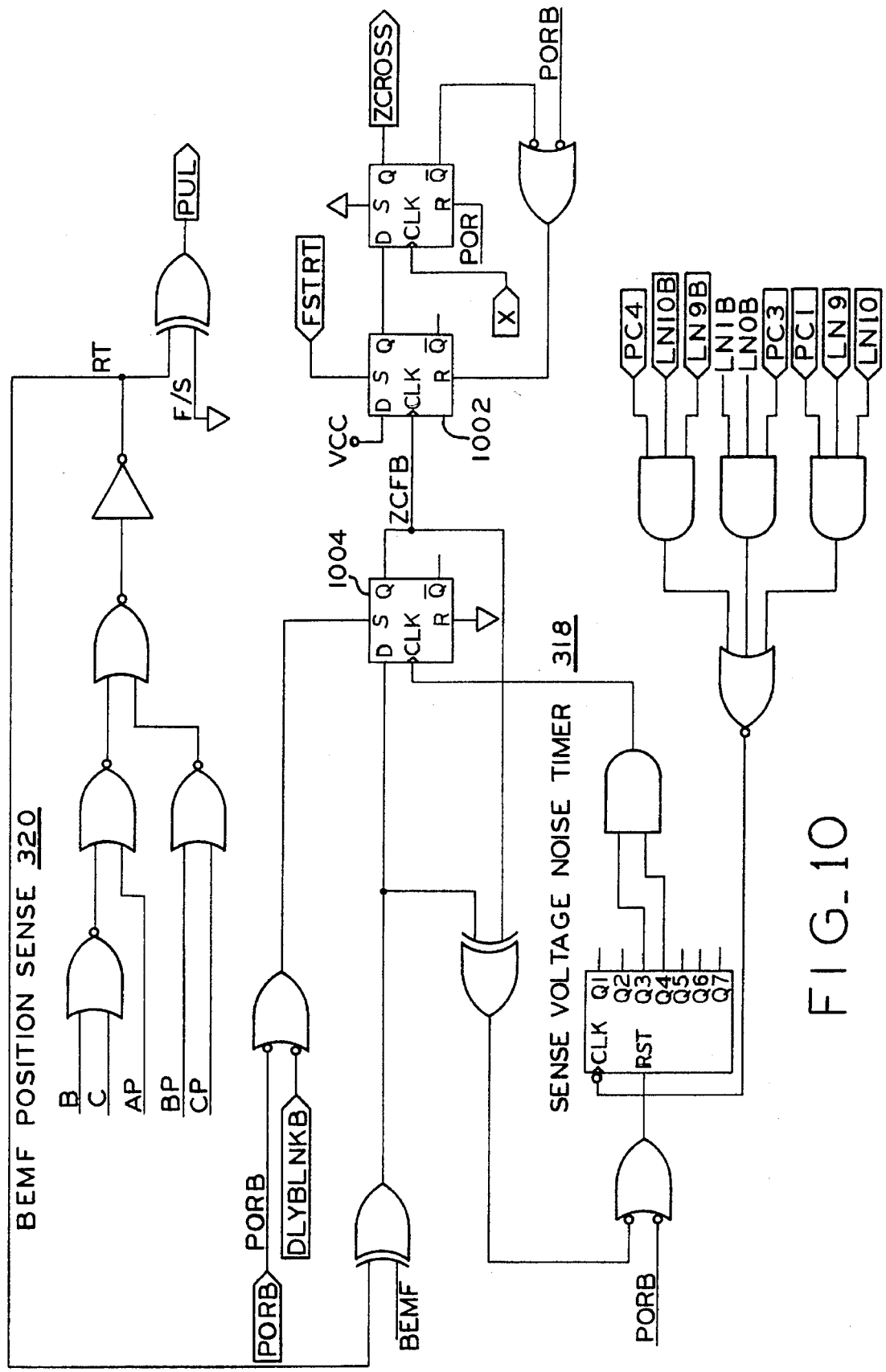
FIG_10

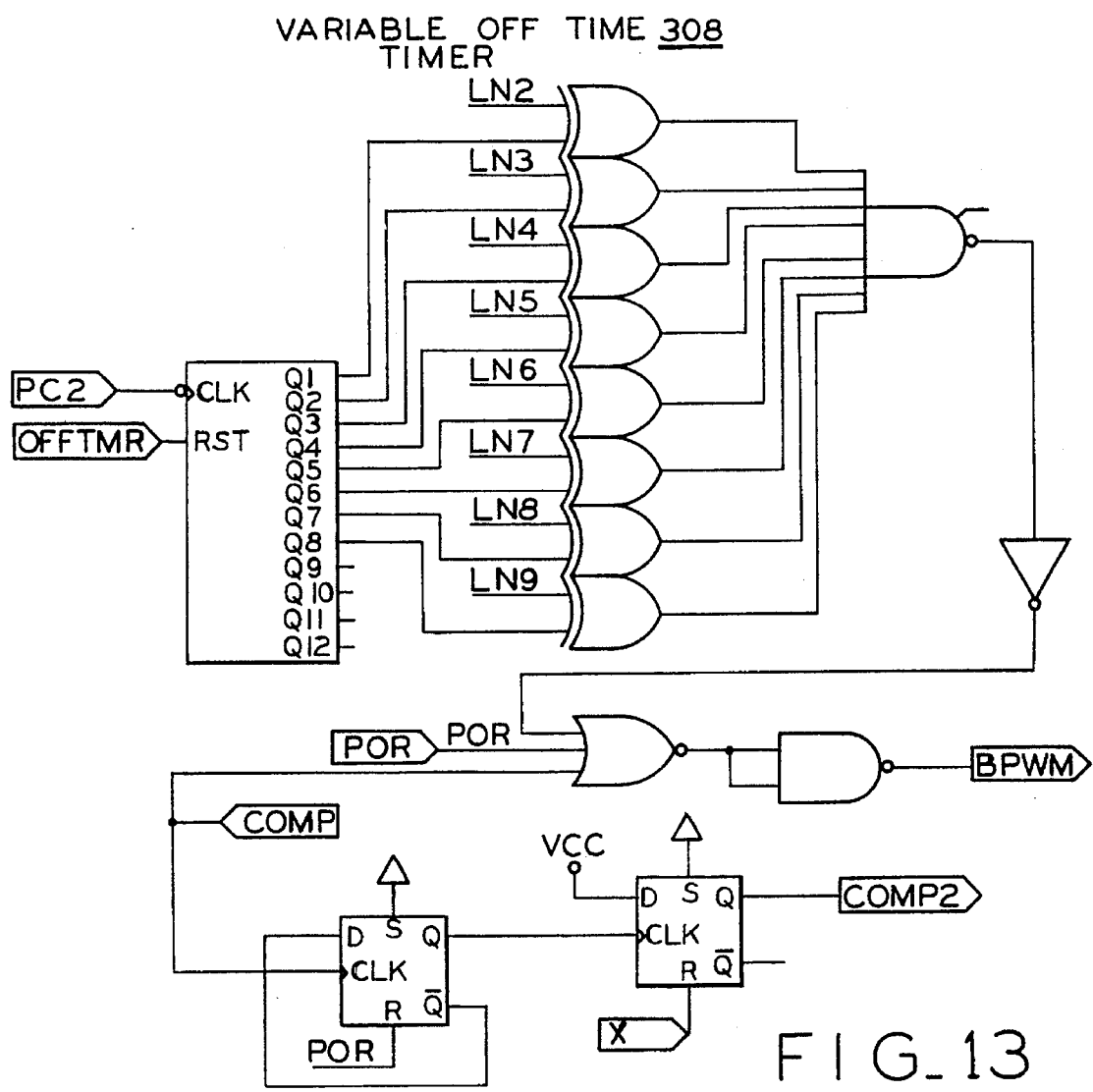
FIG_13

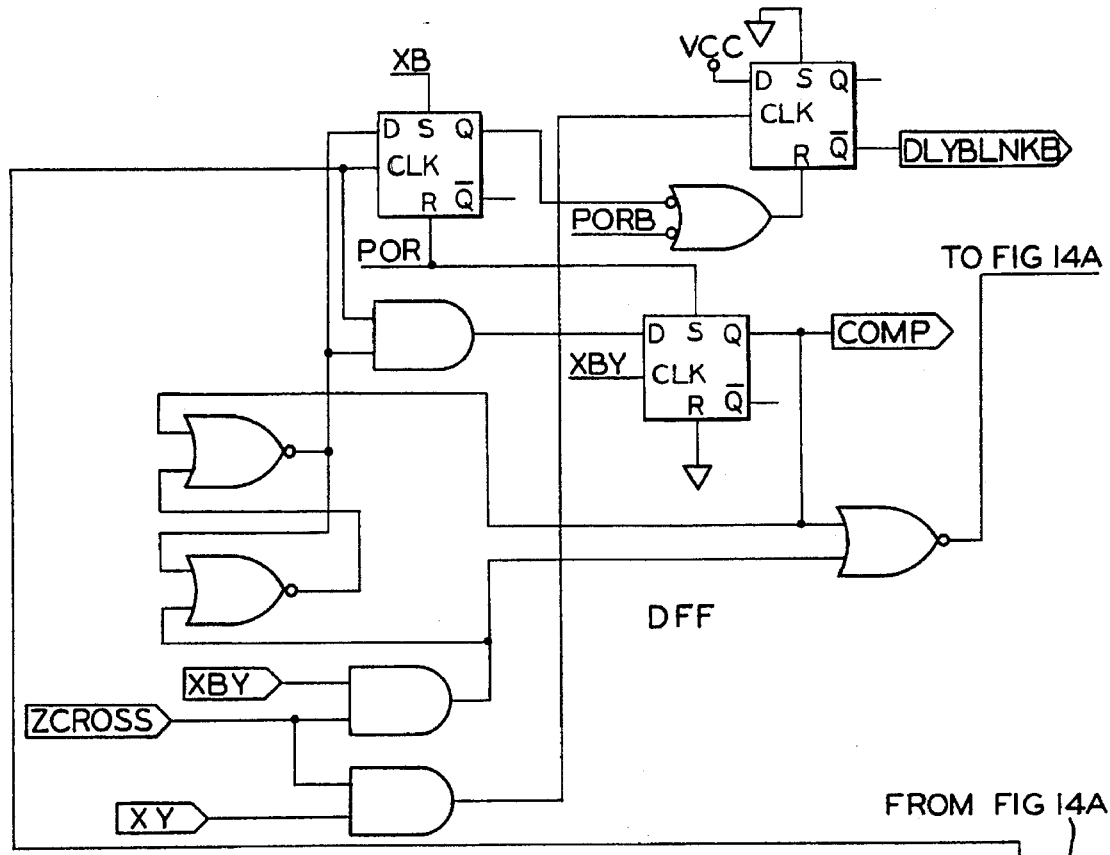
FIG_14 B
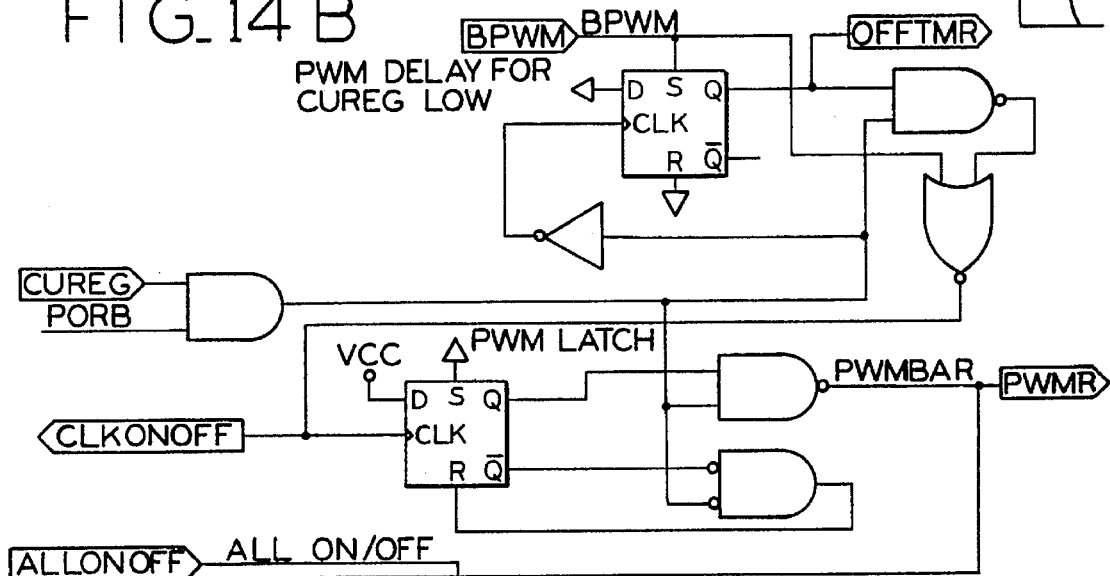
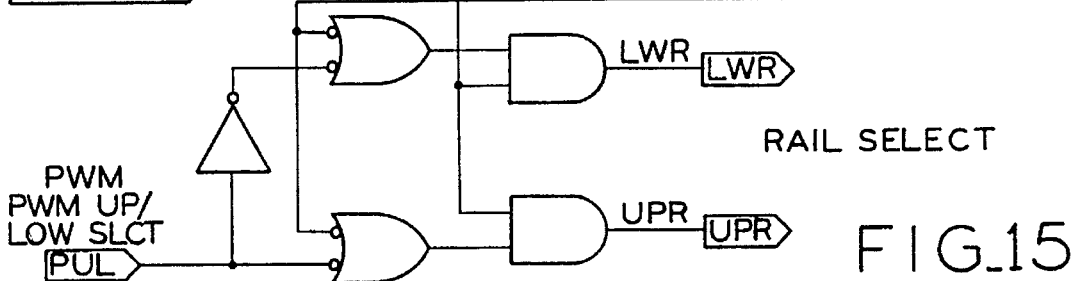
FIG_15

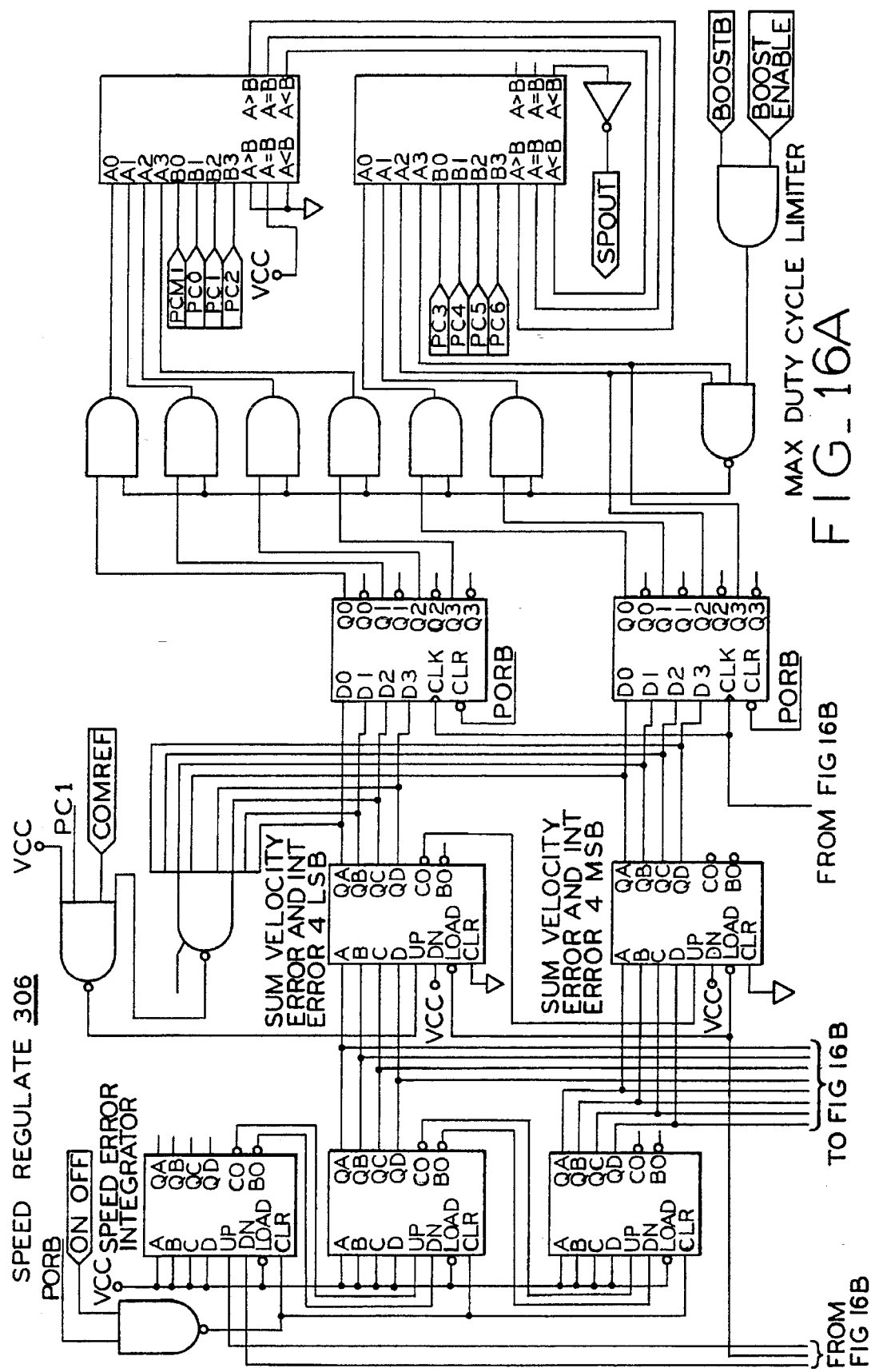

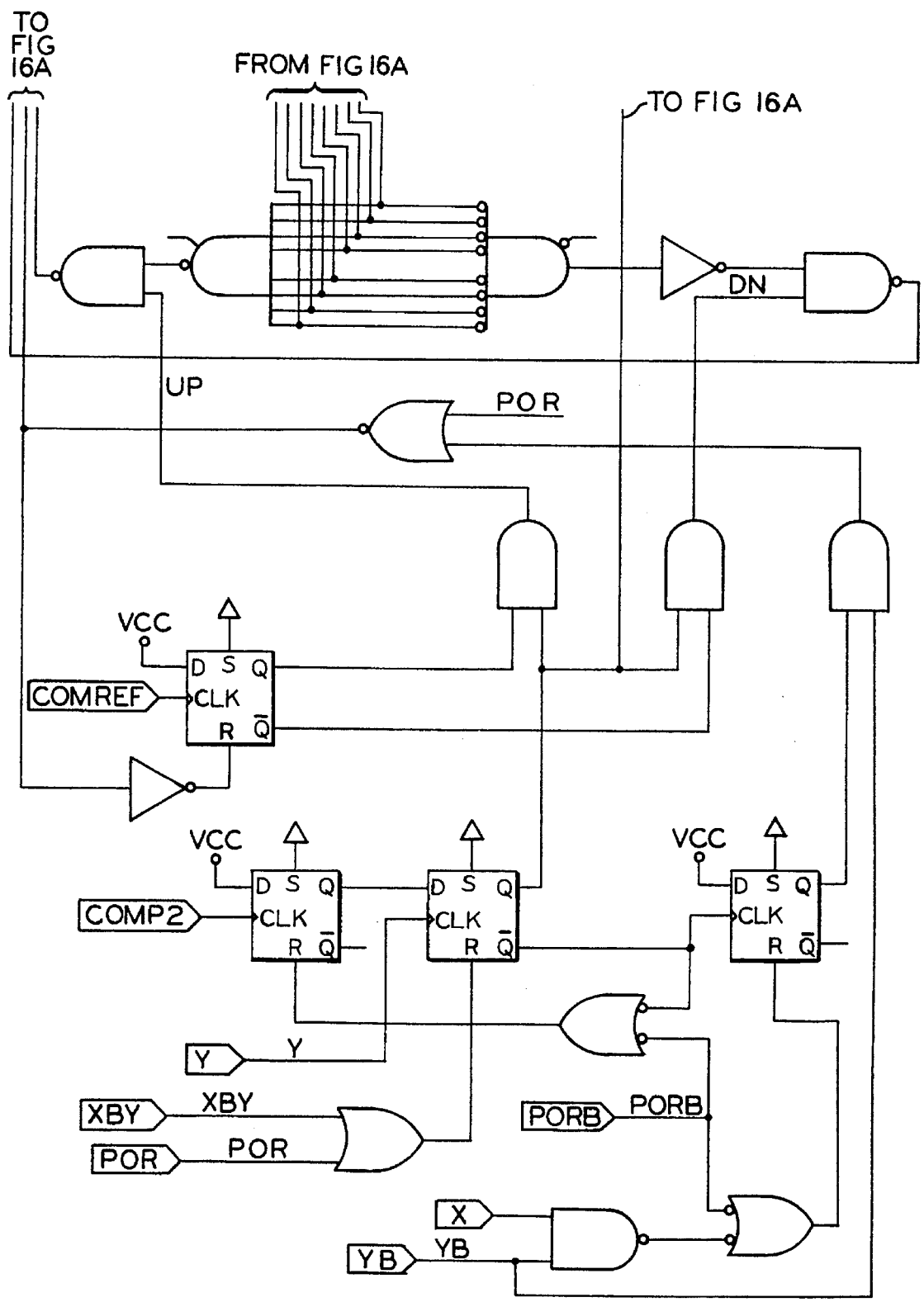
FIG_16B

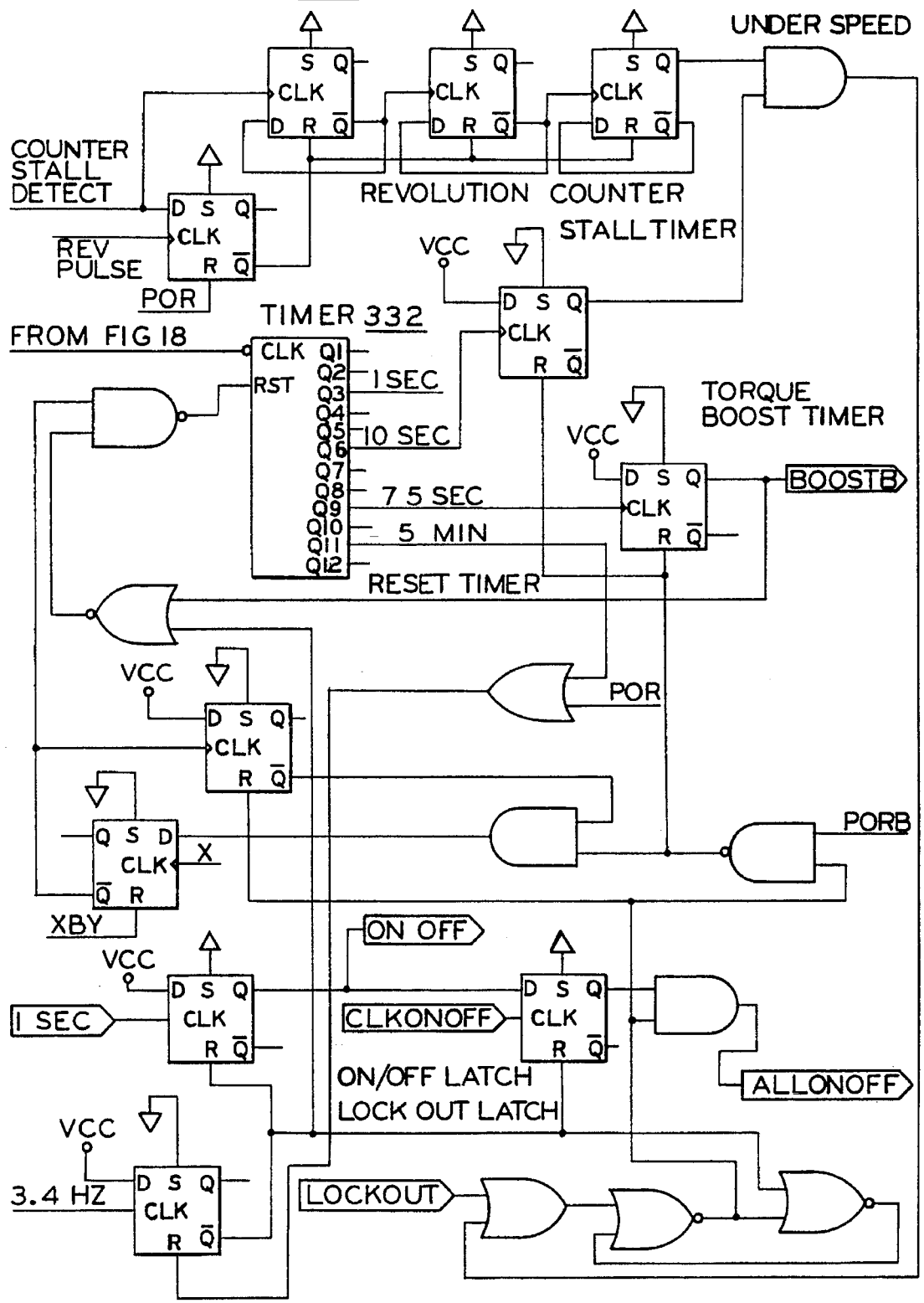
FIG_17

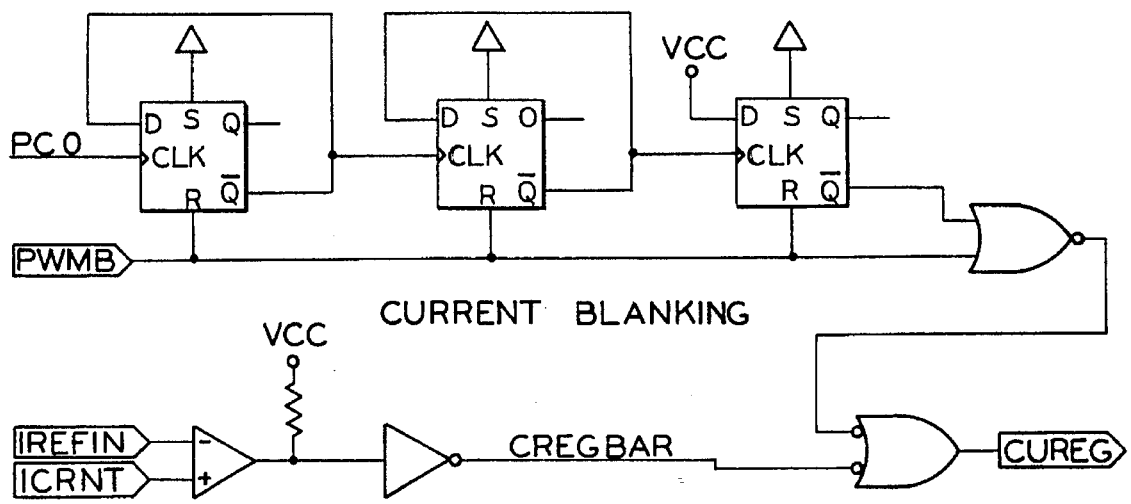
FIG_19
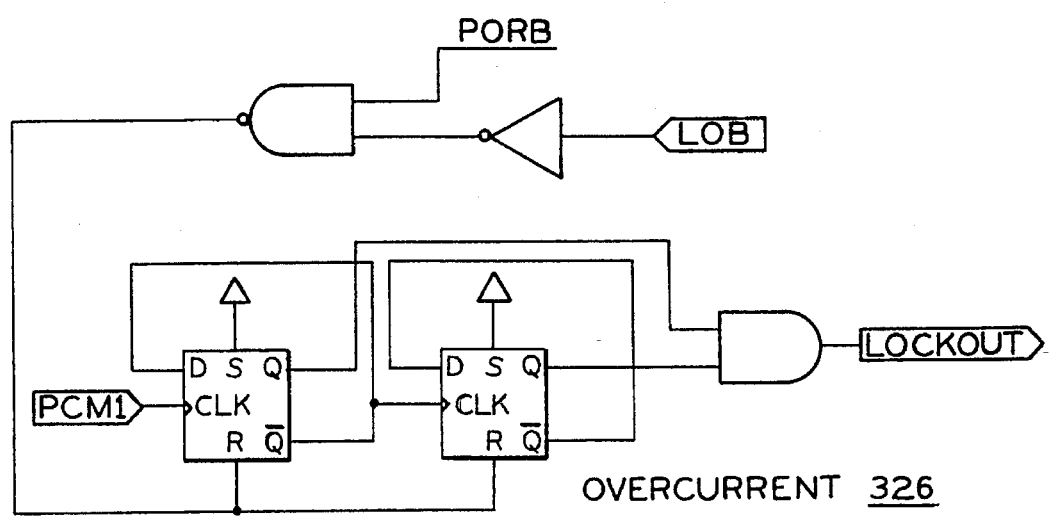
FIG_20

ELECTRONICALLY COMMUTATED MOTOR FOR DRIVING A COMPRESSOR

This is a division of application Ser. No. 08/108.328, filed Aug. 18, 1993, U.S. Pat. No. 5,423,192.

BACKGROUND OF THE INVENTION

This invention generally relates to electronically controlled motors and to systems, such as refrigeration systems having motors therein for driving compressors.

Refrigeration systems typically include motors for driving compressors or other components which have several shortcomings, including operating at a single speed. Particularly, an original equipment manufacturer cannot easily adapt a conventional motor to a number of different applications. Each system uses a motor designed to operate at a particular speed corresponding to that system rather than providing for selecting among various speeds late in the manufacture process. For this reason, it is difficult to operate a particular motor in connection with a number of refrigeration systems having compartments of various sizes or walls of various thicknesses. Further, motors used in many refrigeration systems are not capable of driving the system's compressor at its maximum speed when the system requires rapid cool down and/or operating at a speed selected for maximum efficiency at all other times. Therefore, such motors are ill-suited to increasing refrigerating capacity on demand while providing improved thermal compression and heat exchange efficiencies available at low speed operation for the majority of operating time.

Further, variable speed motors, such as many electronically commutated motors, may be too costly for application in typical refrigeration systems. The control circuits for these electronically controlled motors support various applications through the use of external integrated circuits. External IC support, though, increases the parts count as well as the size of the printed circuit board which results in greater cost for the compressor drive system.

Electronically commutated motors are disclosed in U.S. Pat. Nos. 4,642,537 and 4,757,241 and application Ser. No. 07/889,708, filed May 27, 1992, all of which are commonly assigned with the present application and the entire disclosure of which is incorporated herein by reference in its entirety.

SUMMARY OF THE INVENTION

Among the several objects of this invention may be noted the provision of an improved refrigeration system permitting optimum capacity for maximum cooldown and/or efficiency; the provision of such a system which permits operating the motor at one or more speeds; the provision of such a system which permits operating the motor at a maximum speed; the provision of such a system which permits maximizing total capacity of the system; the provision of such a system which permits maximizing overall efficiency of the system; the provision of such a system which permits internal integrated circuit support; the provision of such a system which permits zero crossing detection of back EMF in the windings of the motor; the provision of such a system which permits digital filtering for minimizing false detection of zero crossings; the provision of such a system which permits locking out field collapse voltages caused by induced current in the windings; the provision of such a system which permits turning off current supplied to a winding after the current reaches a peak value; the provision of such a system which permits delaying commutations after each zero crossing as a function of an interval between commutations and subsequent zero crossings; the provision of such a system which permits accurate speed regulation; the provision of such a system which permits stall speed detection; the provision of such a system which permits operating the motor at a maximum torque for starting the motor; and the provision of such a system which is economically feasible and commercially practical.

Briefly described, a system of the present invention drives a compressor of a refrigeration system at one or more speeds. The system includes a motor having a stationary assembly and a rotatable assembly. The stationary assembly includes windings adapted to be commutated in at least one preselected sequence. The rotatable assembly is in magnetic coupling relation to the stationary assembly and in driving relation to the compressor. The motor drives the compressor at a desired speed corresponding to a speed select signal representative of one of the speeds. The system further includes an application specific integrated circuit (ASIC) connected to the motor. The ASIC receives the speed select signal and is responsive to it for generating a commutation signal. The commutation signal controls commutation of the motor thereby to operate the motor at the desired speed.

In another form, the invention is directed to a method of operating a system for driving a compressor of a refrigeration system at one or more speeds. The system includes a motor having a stationary assembly and a rotatable assembly. The stationary assembly includes windings adapted to be commutated in at least one preselected sequence. The rotatable assembly is in magnetic coupling relation to the stationary assembly and in driving relation to the compressor. The motor drives the compressor at a desired speed corresponding to a speed select signal representative of one of the speeds. The system further includes an application specific integrated circuit (ASIC) connected to the motor. The method includes the steps of generating a speed select signal representative of one of the speeds and inputting the speed select signal to the ASIC which is responsive to the speed select signal. The method further includes generating a commutation reference signal via the ASIC in response to the speed select signal. The ASIC regulates peak current in response to the commutation reference signal thereby to operate the motor at the desired speed.

Alternatively, the invention may comprise various other systems and methods.

Other objects and features will be in part apparent and in part pointed out hereinafter.

BRIEF DESCRIPTION OF THE DRAWINGS

FIG. 1 is a block diagram of one preferred embodiment of an electronically commutated motor (ECM) drive system of the invention and including an application specific integrated circuit (ASIC).

FIG. 2 is a partial schematic diagram of the ECM drive system of FIG. 1.

FIG. 3 is a block diagram of the ASIC of FIG. 1.

FIG. 4A–4C show a timing diagram illustrating the relationship between back EMF and peak current in the windings of the ECM.

FIG. 5A–5G show a timing diagram of one preferred embodiment of a commutation strategy relating to zero crossings, delays and off times.

FIG. 6A–6G show a timing diagram illustrating the relationship between the commutation strategy of FIGS. 5A–5G and speed regulation.

FIG. 7A–7F show a timing diagram illustrating a stall detection strategy.

FIGS. 8A–8C illustrate one preferred embodiment of a schematic diagram of a speed demand circuit of the ASIC of FIG. 3.

FIG. 9 is a schematic diagram of one preferred embodiment of a back EMF multiplexer of the ASIC of FIG. 3.

FIG. 10 is a schematic diagram of one preferred embodiment of a position sensing circuit and a digital noise filter of the ASIC of FIG. 3.

FIG. 13 is a schematic diagram of one preferred embodiment of a variable off time counter of the ASIC of FIG. 3.

FIGS. 14A–14B illustrate one preferred embodiment of a schematic diagram of a commutation delay and blanking circuit of the ASIC of FIG. 3.

FIG. 15 is a schematic diagram of a rail select circuit of the ASIC of FIG. 3.

FIGS. 16A–16B illustrate one preferred embodiment of a schematic diagram of a speed regulation circuit of the ASIC of FIG. 3.

FIG. 17 is a schematic diagram of one preferred embodiment of a stall detect circuit and a timer circuit of the ASIC of FIG. 3.

FIG. 19 is a schematic diagram of one preferred embodiment of a current blanking circuit of the ASIC of FIG. 3.

FIG. 20 is a schematic diagram of an overcurrent protection circuit of the ASIC of FIG. 3.

Corresponding reference characters indicate corresponding parts throughout the drawings.

DETAILED DESCRIPTION OF PREFERRED EMBODIMENTS

Figure 8A:
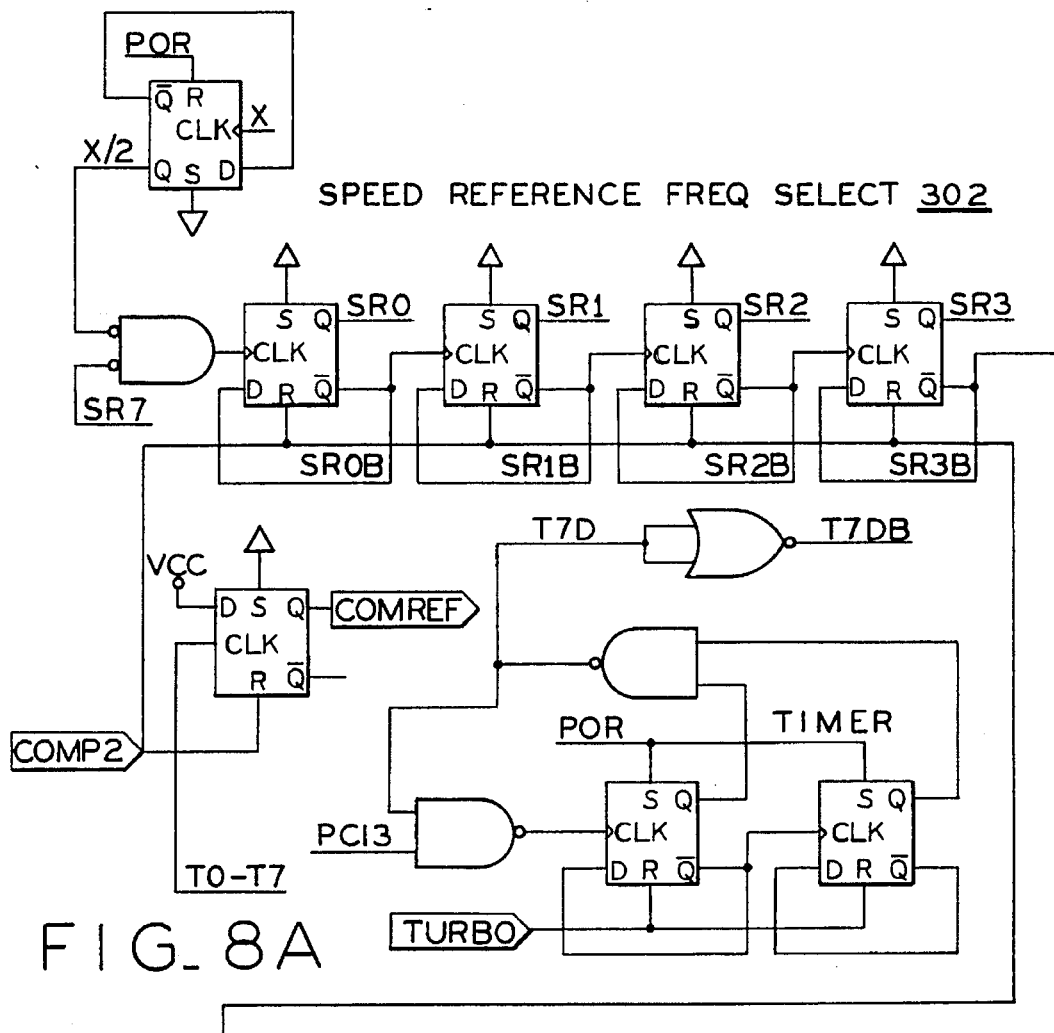

FIG. 1 shows a system 100, one preferred embodiment of the present invention, which is part of a refrigeration system. The system 100 includes a system control 102 for providing a temperature signal and/or other system control signals to an application specific integrated circuit (ASIC) 104 of system 100. The ASIC 104 may be alternatively embodied as a universal electronically commutated motor integrated circuit (UECM IC, not shown). ASIC 104 provides level shifted gate drive signals via lines 106 for electronically controlling a plurality of gate drives 108 which provide enough voltage to switch a plurality of power switches 110. The power switches 110 are used to control rotation in a motor 112, such as an electronically commutated motor (ECM). In a preferred embodiment of the invention, gate drives 108 and power switches 110 may be embodied as an inverter bridge.

The motor 112 of the present invention has a stationary assembly, or stator (not shown), and a rotatable assembly, or rotor (not shown). The rotatable assembly is in magnetic coupling relation to the stationary assembly and mechanically connected via a shaft 114 to a particular device to be driven, such as a compressor 116. Speed of motor 112 may be controlled by controlling the power delivered to the load in order to control the speed of the compressor 116. In this manner, motor 112 can drive compressor 116 at one or more desired speed in response to a speed select signal. Preferably, system 100 regulates torque to obtain the desired speed by matching the load and motor loss demand torque at the desired speed.

Preferably, refrigeration systems consume low amounts of power, e.g., 50 to 240 watt, to maximize efficiency. Therefore, it is necessary for the refrigeration system's compressor 116 to operate at its lowest possible speed and also to operate with accurate speed regulation to avoid operation below a minimum oiling speed. Compressor 116 circulates refrigerant through an evaporator (not shown) and the selected speed corresponds to a rate of circulation of the refrigerant for maximizing efficiency of the refrigeration system. To minimize cost, though, it is necessary to reduce parts count and printed circuit board size. While many control circuits for electronically controlled motors support various applications through the use of external integrated circuits, ASIC 104 incorporates the maximum number of signal functions within itself thereby minimizing the cost of parts. For these reasons, ASIC 104 is predominantly digital in operation and includes a crystal oscillator for determining all timed functions.

Preferably, system 100 self-contains its control of motor 112. In other words, motor 112 operates on its own and does not require a separate controller to select speed. Further, system 100 does not require an externally generated signal to command motor 112 to begin running. Likewise, system 100 does not need a feedback signal, i.e., system control 102 is not referenced to the speed of motor 112 in any way.

Referring further to FIG. 1, ASIC 104 receives the speed select signal via line 118 from at least one speed select switch 120. ASIC 104 responds to the speed select signal to generate a commutation reference signal (for example, as shown in FIG. 6(c)). The commutation reference signal, in combination with a commutation signal generated by ASIC 104, causes system 100 to produce a peak current that matches the load torque demand in response to peak current reference signal SPOUT. Matching torque load with produced torque causes motor 112 to operate at selected discrete speeds. The commutation signal includes a series of commutation pulses wherein each pulse causes a corresponding switching event of power switches 110. The windings are adapted to be commutated in at least one preselected sequence and power switches 110 selectively provide power to the windings of motor 112 in the preselected sequence. Current flow in the windings produce an electromagnetic field for rotating the rotating assembly of motor 112. Thus, ASIC 104 controls the speed of motor 112 which in turn controls the speed of compressor 116. Preferably, ASIC 104 commands two of three windings of motor 112 to be energized at a time and pulse width modulates the power applied to at least one of the energized windings.

The self-contained drive design of system 100 accommodates the selection of one of two pre-programmed speeds at the time of installation of the control in the original equipment manufacturer's product. Since efficiency generally decreases as speed increases, operating compressor 116 at its lowest possible speed (depending on the size of the refrigerator) improves efficiency of system 100. Alternatively, system 100 may accommodate more than three pre-programmed speeds. This late point speed selection provides the manufacturer with capacity options without adding several single speed motors to its inventory for operation at various speeds.

In a preferred embodiment, system 100 provides the option of driving compressor 116 at its maximum speed when an override signal is input to ASIC 104 via line 122. ASIC 104 demands a maximum speed which is higher than any anticipated required speed of operation. The maximum speed corresponds to a circulation rate of refrigerant for maximizing capacity of the refrigeration system. FIG. 1 shows an optional turbo switch 124 in phantom for providing the override, or turbo, signal via line 122 which overrides the speed select signal via line 118. The turbo switch 124, when closed, connects a line-referenced ac voltage to ASIC 104 as the override signal. Preferably, an ac power line may be used as the override signal for selecting maximum speed operation for rapid cool down. The value of the maximum speed is functionally set by the line voltage and the volts/rpm rating of motor 112. The ability of the present invention to reference one of the line voltages accommodates the use of a conventional two stage cold control (non-isolated thermostat contact) as the system control 102. Further, referencing the override signal to the line voltage eliminates the need for optoisolators at the interface between system control 102 and ASIC 104.

System control 102 may be connected through an electromagnetic interference filter 126 to a power supply 128. The power supply 128 provides power via line 130 to operate ASIC 104 which drives power switches 110 by gate drives 108. Power supply 128 also provides high voltage d.c. (H.V.D.C.) via line 132 to power switches 110 for commutating windings included in the stationary assembly of motor 112. Power switches 110 selectively provide power to the windings of motor 112 in a preselected sequence by switching the power supply 128 in connection with the windings.

As shown in FIG. 1, ASIC 104 also receives a signal via line 134 from motor 112 representative of a back electromotive force (EMF) in the windings. The back EMF signal provides information relating to detection of zero crossings for sensing the position the rotating assembly of motor 112. Each of the commutation pulses of the commutation signal corresponds to a zero crossing.

FIG. 2 shows a partial schematic diagram of system 100. In a preferred embodiment, ASIC 104 has an input 202, designated for speed selection (SPEED SELECT) connected to speed select switches 120 via line 118. System 100 has another input 204 connected to the turbo switch 124 for providing the override signal (TURBO) to ASIC 104 via line 122. In addition to the override signal, the binary combination of signals provided to input 202 allows motor 112 to drive compressor 116 at two possible speeds. Speed select switch 120 is embodied as a network including a jumper 206 and a pull-up resistor 208 connected to supply voltage $V_{cc}$. Thus, opening the jumper 206 provides a high level signal to the input 202. Conversely, closing jumper 206 provides a low level signal to input 202. In this manner, a manufacturer may select during installation of system 100 the speed at which motor 112 drives compressor 116 for normal operation of system 100.

Preferably, turbo switch 124 is connected in between the 120 V(ac) line voltage and a pull-down resistor 210, as shown in FIG. 2. The resistor 210 pulls down the signal at input 204 to a low level when turbo switch 124 is open. When turbo switch 124 is closed, the presence of line voltage allows a pull-up resistor 212 to pull up the signal being input to 204 to a high level. ASIC 104 commands operation of motor 112 at a maximum speed in response to a high level signal at input 204.

In an alternative embodiment of the invention, speed select switches 120 may include three speed selection switches providing eight possible desired speeds. In such an embodiment, the binary combinations of the switches may be designated as desired speeds for operating a compressor, leaving one of the combinations designated as a maximum speed. Three networks similar to the network including jumper 206 and resistor 208 provide for speed selection. In this embodiment, each of the three jumpers may be connected to system voltage $V_{cc}$ via a pull-up resistor on the ASIC side and connected in parallel with each other on the other side. Each jumper is connected to an ASIC input. This arrangement further includes a pull-down resistor having one end grounded and the other end connected to a node formed by the common connection of the parallel jumpers and the ASIC side of the turbo switch. Thus, opening zero, one or two of the three jumper connections during installation of system 100 in the manufacturer's product provides for selecting one of the seven possible pre-programmed speeds for compressor operation (opening all three jumper connections is reserved for the maximum, or turbo, speed).

Selection of maximum speed operation, or turbo, is optional and accomplished at any time during control operation when turbo switch 124 is closed. In this alternate embodiment turbo switch 124 is connected to speed select switches 120 such that a closed turbo switch 124 causes a high level input to ASIC 104 regardless of the position of speed select switches 120. Since the pull-down resistor would otherwise pull down any closed jumper inputs, having its potential at $V_{cc}$ produces an all high state (designated for maximum speed).

In the preferred embodiments, the voltage needed to bias resistor 210 up to $V_{cc}$ is present only once per line cycle since an ac signal is being input to ASIC 104. ASIC 104 overcomes this difficulty by acknowledging the override signal at a predetermined interval less than the period of the ac line voltage and responding to a positive waveform portion of the signal to start a timer (shown in FIG. 8A). The timer sets the maximum speed option at each occurrence and maintains operation of compressor 116 at its maximum speed for longer than the lowest anticipated line frequency period (approximately 20 milliseconds). If ASIC 104 detects the absence of positive waveform portions for at least two consecutive predetermined intervals, system 100 operates compressor 116 at the selected one of the desired speeds.

Referring further to FIG. 2, a peak current circuit 214 senses a variable duty cycle signal representative of the peak current or torque requirement (SPOUT) of motor 112 and generates a measured current versus peak current requirement signal (ICRNT) and a reference (IREFIN). Particularly, an external resistor-capacitor network 216, in combination with resistors 218, 220 and 222, effects control of peak current.

In the preferred embodiment, phase currents of the motor can be sensed using shunt resistors, current transformers, Hall-effect current sensors or other sensors or circuits. In the embodiment illustrated, voltage is developed across a shunt resistor network shown at reference character 224 by current supplied to the windings of motor 112. In this manner, ASIC 104 senses motor phase currents by the current flowing through shunt resistors 224 when power is being exchanged from power supply 128 to motor 112 and vice versa. A transistor shown at reference character 226 provides a protective overcurrent limit.

Figure 8B:
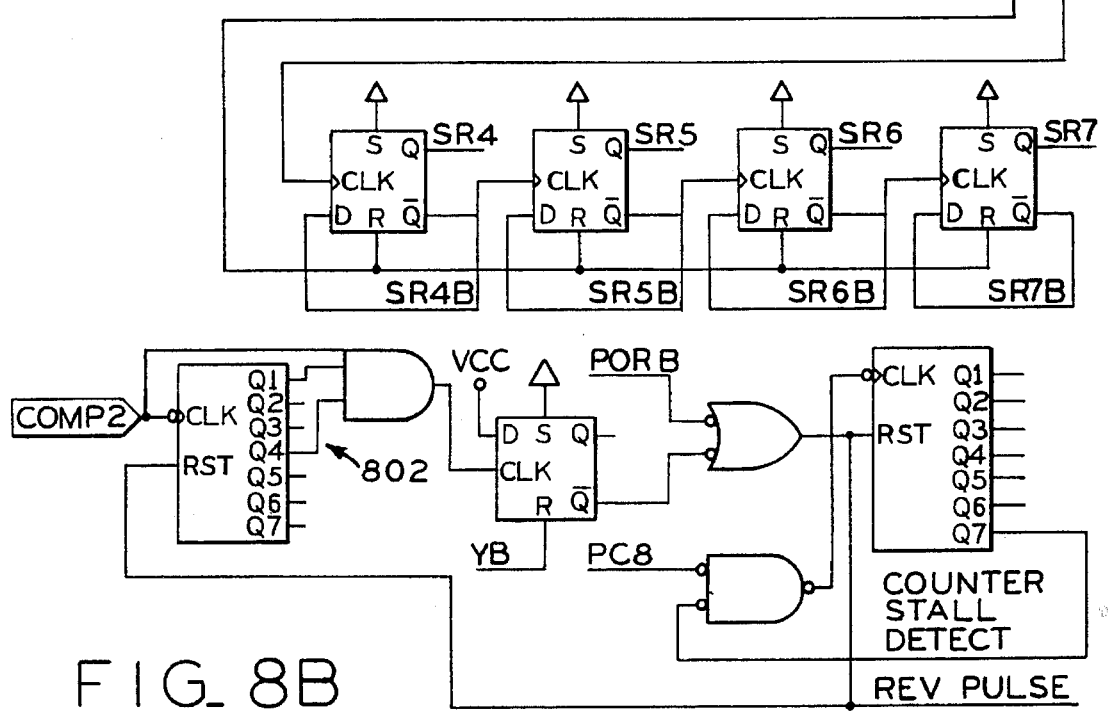
Figure 11:
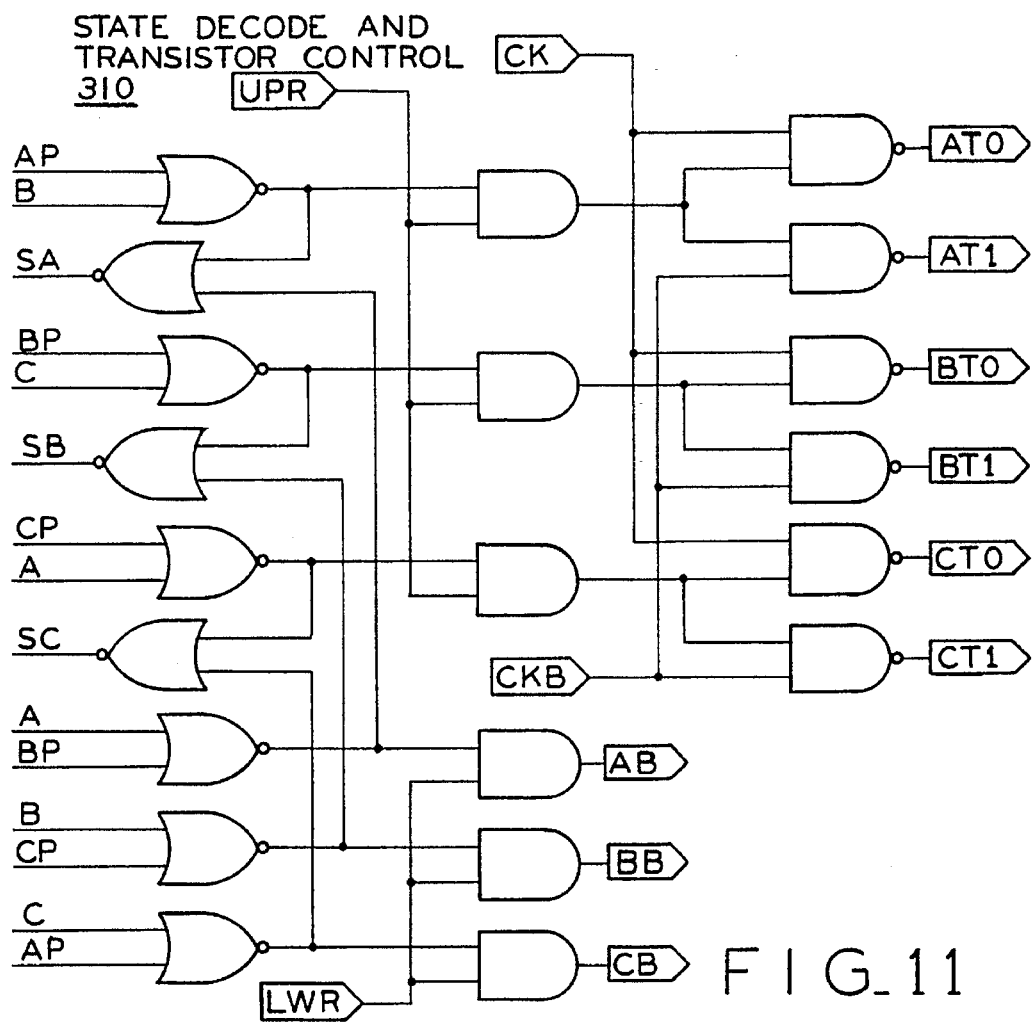
FIG. 11 is a schematic diagram of one preferred embodiment of a state decode and transistor control of the ASIC of FIG. 3.

FIG. 3 illustrates ASIC 104 of system 100 in block diagram form. ASIC 104 responds to either the speed select signal via line 118 or the override signal via line 122. A demand speed circuit 302 (shown in more detail in FIGS. 8A–8C as a speed frequency reference select circuit)

receives the speed select signal at input 202 and outputs it via line 304 to a speed regulation circuit 306 (shown in more detail in FIGS. 16A–16B). The speed regulation circuit 306 also receives and responds to the override signal. Speed regulation circuit 306 regulates the speed of motor 112 and prevents the speed of compressor 116 from dropping below its minimum oiling speed. System 100 also includes a peak current circuit 314 external to ASIC 104 for regulating the peak current in the windings of motor 112 as a function of speed regulation circuit 306 output SPOUT. System 100 regulates current in the windings of motor 112 by turning off power to each of the windings when the current has achieved the required value for a predetermined amount of time based on the interval between zero crossings. In a preferred embodiment of the invention, ASIC 104 includes a PWM timer 308 (shown in more detail in FIG. 13 as a variable off timer) for timing this predetermined amount of time. A state decode and transistor control circuit 310 (shown in more detail in FIG. 11) receives and responds to the PWM timer 308 via line 312 for controlling gate drives 108.

Referring further to FIG. 3, system 100 includes means for sensing the position of the rotatable assembly of motor 112 such as a back EMF sensing network 314 (shown in more detail in FIGS. 9 and 10). In one preferred embodiment, motor 112 has star connected windings and 120 degree conduction intervals. During operation, motor 112 has two of its three windings energized at any given time for developing torque. ASIC 104 selects the unenergized winding for position sensing by observing the motor phase back EMF waves when current in the selected phase has decayed to zero. The back EMF sensing network 314 detects the zero crossings of the difference between the back EMF voltage of the selected winding of motor 112 as compared to a reference level. The reference level is the sum of the voltages of the windings other than the selected winding.

For example, power switches 110 may include a top switch and a bottom switch connected to each phase of motor 112. At a given time, gate drives 108 drive power switches 110 to connect both the B phase and the C phase to power supply 128. At least one of the switches 110 may be used to pulse width modulate the power applied to at least one of the energized phases. In this example, the unenergized A phase is used for back EMF sensing.

ASIC 104 determines rotor position as a function of the zero crossings and generates commutation signals in response thereto. The commutation instances of a motor phase are determined from the information about the zero crossings of back EMF in that phase. Torque production in a phase of motor 112 is determined by the product of the current circulating in the phase and the back EMF of that phase. To sustain positive torque, therefore, it is necessary to energize a winding of motor 112 when the back EMF has crossed zero in the direction that will oppose the voltage energizing the winding. At low speeds, for example, it is convenient to energize a winding of motor 112 when it is experiencing maximum rotor flux. That is, the motor phase must be energized 30 electrical degrees after the zero crossing.

Figure 14A:
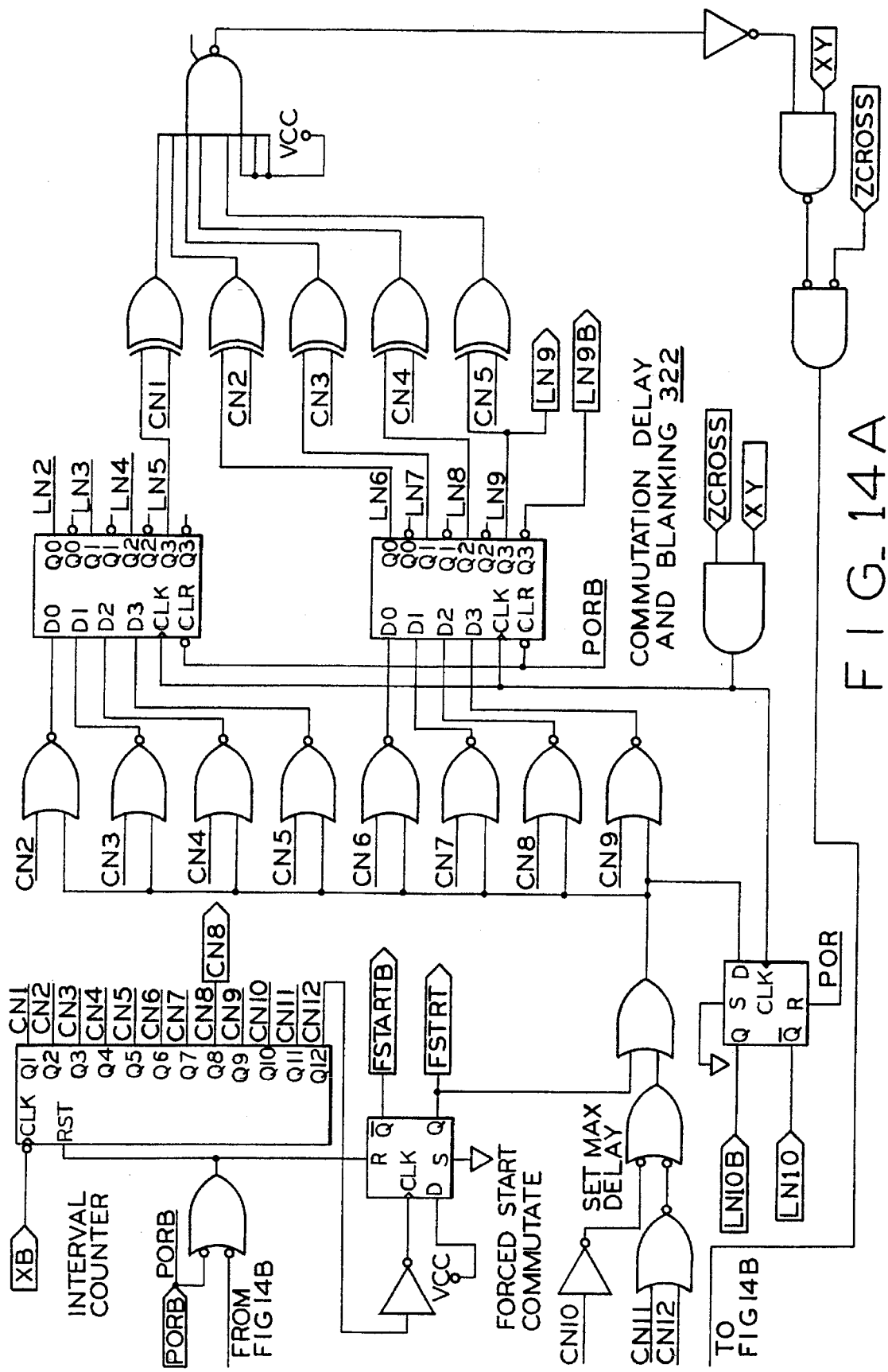

In order to detect zero crossings, ASIC 104 includes a multiplexer circuit 316 (shown in more detail in FIG. 9) for multiplexing the back EMF signal (received via line 134). ASIC 104 compares the multiplexed signal to a reference level input signal to obtain a comparison signal (BEMF) indicative of back EMF which passes through a noise timer 318 (shown in more detail in FIG. 10). The noise timer 318 filters the BEMF signal before it is input to a position sensing circuit 320 (shown in more detail in FIG. 10). The position sensing circuit 320 provides a zero crossing detector signal (ZCROSS) to which ASIC 104 responds. ASIC 104 controls commutation as a function of the elapsed time between commutations and zero crossings measured by a counter shown in FIG. 14. ASIC 104 generates power switching control signals for power switches 110 in response to such position sensing.

Other ECM controls employ analog multiplexing in the input to a transconductance amplifier for integration of back EMF voltage to the desired delay past zero crossing or use information from three external comparators (one for each phase) to determine back EMF zero crossing. Advantageously, the present invention provides analog back EMF sensing in ASIC 104 by using only a single comparator (shown in FIG. 9) for all three motor phases resulting in significant cost savings.

Figure 12:
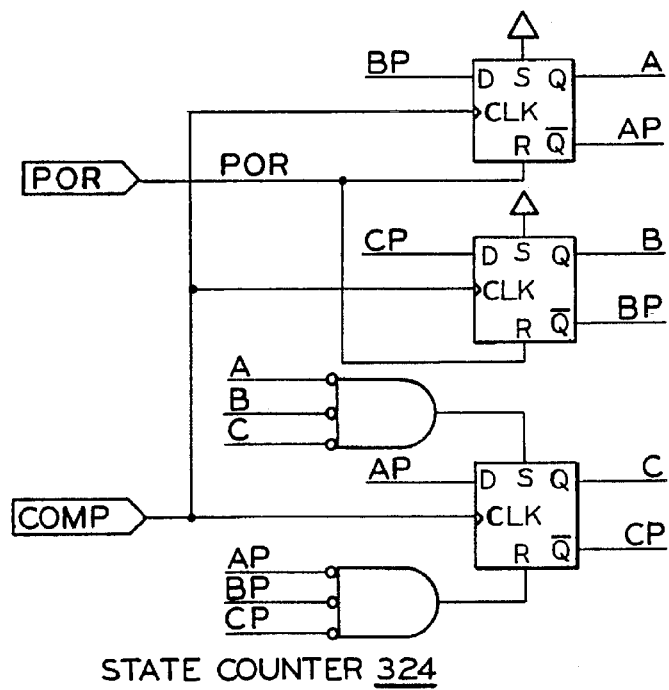
FIG. 12 is a schematic diagram of one preferred embodiment of a state counter of the ASIC of FIG. 3.

Zero cross detection of back EMF requires some fixed angle of rotation delay before commutation to effect the optimum production of torque. Reference character 322 shows a commutation delay and blanking circuit (shown in more detail in FIGS. 14A–14B) responsive to ZCROSS for accomplishing such delay. A state counter 324 (shown in more detail in FIG. 12) receives the delayed zero crossing signal for inputting to the state decode and transistor control circuit 310 for controlling gate drives 108. The state counter 324 determines the sequence in which gate drives 108 operate and which winding is unenergized for back EMF sensing. State counter 324 also determines the direction of rotation of motor 112.

Figure 18:
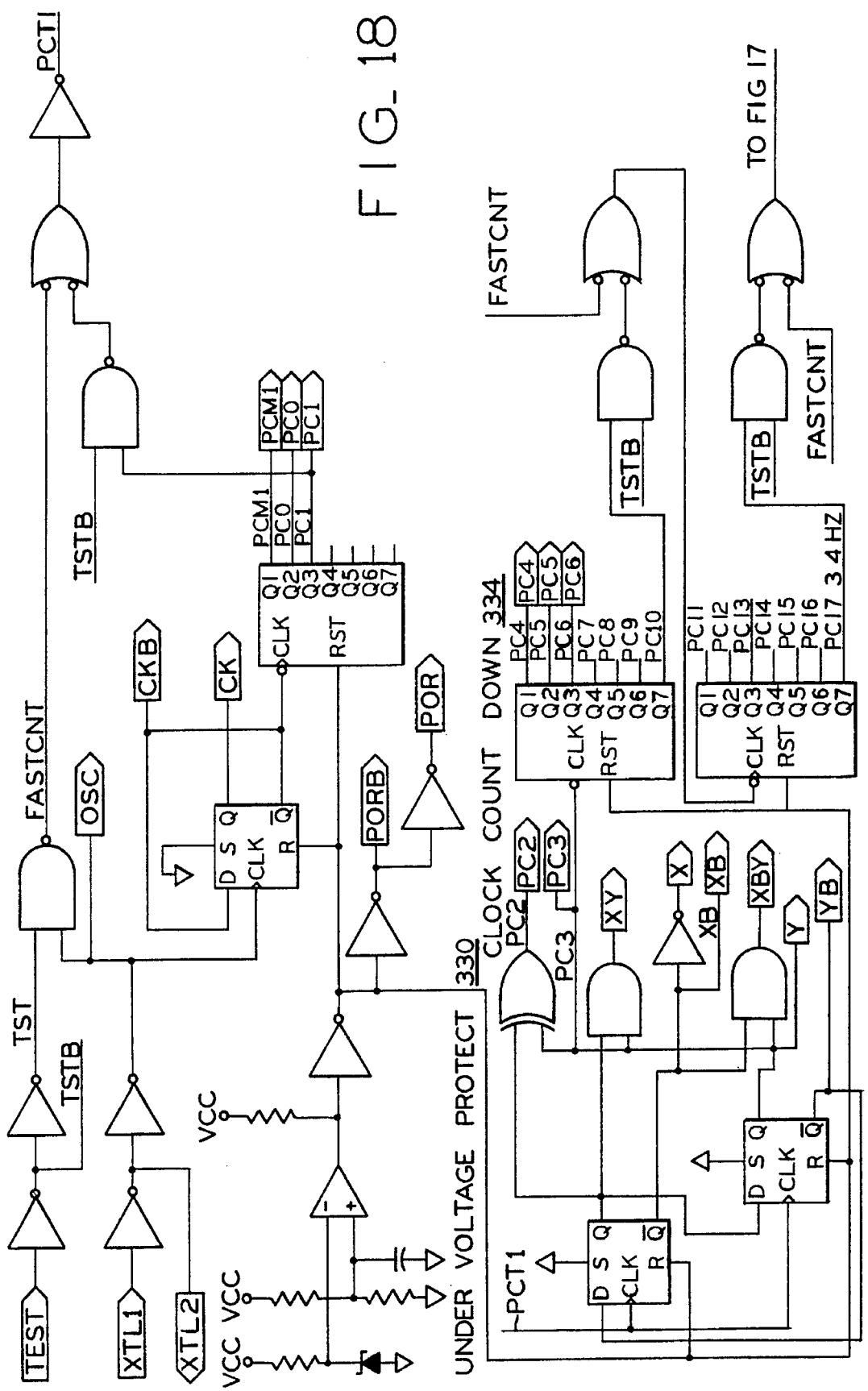
FIG. 18 is a schematic diagram of one preferred embodiment of an undervoltage protection circuit and a clock count down circuit of the ASIC of FIG. 3.

ASIC 104 also includes various protective control circuits. The overcurrent protection limit 226 and a digital filter 326 (shown in more detail in FIG. 20) detects current conditions in the windings of motor 112 above a certain limit. Further, ASIC 104 includes a stall speed detector 328 (shown in more detail in FIG. 17) and an undervoltage detector 330 (shown in more detail in FIG. 18) for detecting undervoltage conditions of logic power supply 130. A timer 332 (shown in more detail in FIG. 17) times the duration of the particular conditions to avoid false triggering of the protective circuits due to instantaneous errors and to reset ASIC 104 to enable motor 112 after a predetermined period. ASIC 104 preferably provides a clock input to the timer 332 and other circuits with a clock countdown circuit 334 (shown in more detail in FIG. 18).

In the event of an overcurrent, underspeed or undervoltage condition, ASIC 104 disables motor 112 by instructing state decode and transistor control circuit 310 via lines 336 and 338 to turn off gate drives 108 thereby preventing current flow to the windings.

Referring to FIG. 4, a timing diagram shows various signals generated or sensed by ASIC 104. FIG. 4(*a*) shows a representation the back EMF voltages for phases A, B and C of motor 112. Also, exemplary zero crossings are indicated at reference character ZC. As described above, ASIC 104 uses multiplexer circuit 316 to multiplex the back EMF signal and to compare the signal to a reference level input signal for detecting the zero crossings. FIG. 4(*b*) illustrates the multiplexed back EMF output of multiplexer circuit 316. The preferred embodiment of the invention utilizes noise timer 318 for timing the duration of level changes, or transitions, in the multiplexed back EMF signal before ASIC 104 determines zero crossing instances. Thus, position sensing circuit 320 of ASIC 104 provides the zero crossing detector signal ZCROSS to which ASIC 104 responds for controlling commutation of motor 112. In other words, ASIC 104 generates power switching control signals for power switches 110 in response to such position sensing.

FIG. 4(c) shows a current waveform for each phase relative to the back EMF in the windings. Off timer 308 regulates the current in the windings of motor 112 as a function of the peak current reference value by turning off power to each of the windings for a predetermined amount of time based on the interval between zero crossings. As shown in FIG. 4(c), this causes the current in a particular winding to decay from its peak value.

With respect to FIG. 5, commutation is shown in the form of a timing diagram. FIG. 5(a) shows the multiplexed back EMF signal of FIG. 4(b) for comparison.

Further, turning power switches 110 on or off generates current spikes by the recovery of semiconductor switching devices. The transient voltages generated by these spikes cause erroneous information on the back EMF sensing. For these reasons, a particular difficulty in back EMF sensing is extracting the necessary information from a signal contaminated with field collapse voltage at the beginning of a commutation period and by PWM switching noise throughout the commutation period. Commonly assigned U.S. application Ser. No. 07/889,708, filed May 27, 1992, the entire disclosure of which is incorporated herein by reference, discloses sampling comparator outputs at times deemed to be free of switching noise.

ASIC 104 digitally filters the comparison signal BEMF with noise timer 318 to reduce the effects of erroneous information caused by turning on and turning off events of power switches 110. These switching events cause current spikes due to the nature of semiconductor devices. Noise timer 318 is preferably embodied as a sense voltage noise timer having a filtering characteristic as shown in FIG. 5(b). The comparison signal BEMF has at least two states and noise timer 318 passes the comparison signal only when one of the states thereof are present for longer than a predetermined duration. The predetermined duration is a function of the speed of motor 112 and decreases as the speed of motor 112 increases.

In a preferred embodiment of the invention, the minimum length of the predetermined duration is a first period, such as 416 microseconds, when the speed of motor 112 is less than or equal to a first transition speed, such as 340 rpm. Preferably, system 100 employs two transition speeds for optimum performance. In that case, the minimum length of the predetermined duration is a second period, such as 208 microseconds, when the speed of motor 112 is greater than the first transition speed and less than or equal to a second transition speed, such as 686 rpm. The minimum length of the predetermined duration is a third period, such as 52 microseconds, when the speed of motor 112 is greater than the second transition speed. In this manner, ASIC 104 eliminates false zero crossings caused by ringing of the sensed voltage after switching events of power switches 110.

Without duration filtering, a positive current spike at turn-on of switches 110 may cause erroneous information about the motor phase current. This could cause a drop in phase current and a resulting drop in torque. Duration filtering ignores the erroneous current information.

One particular difficulty associated with back EMF sensing systems is that the switching events of power switches 110 cause protracted ringing of the winding voltages. For this reason, the digital duration filtering of the present invention embodied by timer 318 advantageously outperforms a blanking or sampling approach.

Inductive current in the selected winding produces a field collapse voltage ending prior to appearance of the back EMF. Preferably, back EMF sensing network 314 disregards false detection of back EMF zero crossings caused by the field collapse voltage. Commonly assigned U.S. Pat. No. 4,642,537, the entire disclosure of which is incorporated by reference herein in its entirety, shows a field collapse voltage lockout accomplished by a dedicated back EMF zero approach comparator and RS flip flop. This invention accomplishes the same function by an intrinsic feature of a clocked D flip flop 1002 of FIG. 10.

According to the present invention, the output of clocked DFF 1002 (shown in FIG. 10) is not responsive to the level of the clocked input ZCFB. Rather, the output is responsive to the transition of ZCFB from zero to plus, i.e., the transition of the clocked input from the zero state to the one state. ASIC 104, therefore, accomplishes field collapse lockout by holding the clock state of a DFF 1004 at one during the initial instant of commutation, then allowing the field collapse voltage to sustain the one state until the current in the selected winding reverses direction. Once the termination of the field collapse has occurred for the duration of any time delay present in the digital filtered input, the clock input is reset to zero which enables the DFF 1002 to respond to the next digitally filtered transition following the zero crossing of the motor 112 back EMF.

U.S. Pat. No. 4,642,537 discloses a zero approach voltage comparator being used for detection of false field collapse lockouts due to errors existing in a back EMF sensing network at start-up of motor 112. The present invention, however, eliminates the comparator by equipping the start circuit of motor 112 with circuitry to override the lockout of state advance caused by detection of field collapse voltages.

FIG. 5 also illustrates preferred delayed zero crossing and commutation delay signals. As described above, zero crossing detection of back EMF for controlling commutation requires delaying commutation after zero crossing by a fixed angle of rotation to effect the optimum production of torque. FIG. 5(c) shows a zero crossing signal delayed by the duration of timer 318 and FIG. 5(d) shows the preferred commutation signal, each commutation pulse being delayed from the preceding zero crossing. Commutation delay and blanking circuit 322 responds to the ZCROSS signal for accomplishing the delay. State counter 324 receives the delayed commutation signal and inputs the signal to state decode and transistor control circuit 310 for controlling gate drives 108. Power switches 110 commutate power to the windings of motor 112 as a function of the commutation signal. In a preferred embodiment of the present invention, back EMF sensing network 314 measures an interval T from a switching event of power switches 110 to its subsequent zero crossing. The commutation rate (i.e., the frequency of commutation pulses) of the commutation signal is a function of the measured interval.

ASIC 104 includes a counter (shown in FIG. 14A) incrementally counting the interval T from each switching event to each subsequent zero crossing. At zero crossing, ASIC 104 stores the counter total (less one or more least significant bits) in a register and the resets the counter to zero. The timing of the commutation delay after commutation is then initiated by the same counter by a shifted comparison between present count and the stored prior count. In a preferred embodiment of the invention, the commutation delay angle is a binary fraction (e.g., $\frac{1}{2}$, $\frac{1}{4}$, $\frac{1}{8}$, ... $\frac{1}{2^n}$) of the previous count of the interval from commutation to zero cross. The denominator of the fraction depends on the number of bits shifted in the comparison process.

For example, the fraction $\frac{1}{16}$ has a shift of 4 bits which corresponds to a 3.53 electrical degree rotation delay past zero cross. Note that the delay angle may be substantially less than an optimum delay angle on an ideal ECM with trapezoidal back EMF. A small angle may be required due to the poor back EMF waveform shape or high inductance of the salient pole ECM being used. Advantageously, system 100 provides improved prediction of the subsequent interval during acceleration based on the residual time from commutation to zero crossing. As motor 112 accelerates, the commutation interval T is reduced. For this reason, many ASIC's estimate a delay which is too long. The preferred embodiment of the present invention leaves a smaller residual to zero crossing resulting in a smaller estimate for the next interval. This advantage is more important when large delay angles are used.

FIG. 5(e) shows a delay blanking pulse for preventing detection of zero crossings during commutation. The ability to sustain torque during rapid acceleration requires that the estimate of the next delay not be so great that the sum of delay and back EMF blanking (equal to twice the delay in this design) not exceed the time to the next zero crossing. Should this sum extend past the next zero crossing, the intrinsic field collapse voltage lockout of the present invention will inhibit the detection of zero crossings and induce loss of position and torque. For this reason, as well as to minimize the size of the storage register and comparator, only delays associated with speeds above a transition speed are stored. In a preferred embodiment of the invention, the transition speed is 686 rpm. Below 686 rpm, a maximum delay associated with the design rotation angle at 686 rpm is stored, i.e. a counter counts out a delay. In this manner, the only risk of unacceptable delay error is associated with limiting the delay angle to a maximum during acceleration occurring during the first few commutations after starting. Since too short of a delay only reduces efficiency and marginally effects starting torque, such a limit on the delay when the speed of motor 112 is below the transition speed is acceptable and preferable.

Referring to FIGS. 5(f) and 5(g) during commutation of motor 112, the winding in which back EMF is sensed is essentially without current. Generally, in prior practice current may not be turned on immediately at commutation. Rather, an asynchronous PWM oscillator clock triggers turn-on With relatively high PWM clock rates, this delay does not materially affect performance. However, at low PWM clock rates, the delay in turning on power switches 110 corresponding to this winding could result in a significant loss of torque at specific speeds. ASIC 104 forces turn-on at commutation or a short time interval after commutation. When turn-on is inhibited by a low state on CUREG (see FIG. 19) at commutation, turn-on is deferred until a high is obtained (indicating that the transient delay in current detection is complete). Commonly assigned U.S. Pat. No. 4,757,241, the entire disclosure of which is incorporated by reference herein in its entirety, shows a methodology for accomplishing this.

As shown in FIG. 5(f), the present invention employs a switching strategy for applying power to the windings until current reaches a peak current (IREF). At IREF, off timer 308 begins timing a predetermined interval, such as T/4. For this period, current is off and allowed to decay. The period T/4 varies according to the speed of motor 112 since it is a function of the interval T measured essentially between consecutive switching events of power switches 110. Therefore, more consistent torque is developed as speed changes.

Both fixed off-time or asynchronous PWM oscillator types of control produce irregular torque versus speed curves at low PWM frequencies and constant peak current. Changes in peak-to-average current ratio resulting from either the nonvariant off-time of the constant off-time control or the constant clock frequency of the asynchronous PWM oscillator control causes this irregularity. Preserving the peak-to-average current ratio for low PWM frequencies requires the synchronization of turn-on with commutation and the retention of the ratio of off-time to the commutation interval. In this manner, system 100 effectively responds to the introduction of a winding having zero current that occurs at commutation as well as the change in back EMF that occurs as speed changes. Back EMF directly influences the rate of current decay.

FIG. 5(g) shows a preferred off-time characteristic. In a preferred embodiment of the present invention, the off interval is a fraction (23%) of the previous total commutation interval. In other words, the off time is 25% of T or 23% of T plus the commutation delay. In this case, the period from commutation pulse to commutation pulse is T plus the delay. As an example, at low speeds such as 1000 rpm, power switches 110 switch only once or twice during each commutation period T (for a six pole motor at 600 Hz rate). Advantageously, the present invention uses the low switching frequency to reduce electromagnetic interference by slowing the turn-on rate of the power devices. The increase in turn-on loss is held to a minimum by the low operating frequency. An additional filter may be used in case of slight increases in conduction losses.

FIG. 6 regards speed regulation of the present invention. FIGS. 16A–16B show speed regulation circuit 306 in greater detail. Accurate speed regulation, provided by system 100, facilitates operation of motor 112 at the lowest speed possible without risking operation at a speed below the minimum oiling speed of compressor 116. Further, accurate speed regulation ensures consistent operation of motor 112 for driving compressor 116 at its optimum speed. For these reasons, the present invention includes an accurate speed reference and a high performance servo regulate loop, such as a 1% crystal time reference and the digital equivalent of a zero error (class 1) servo speed regulate loop, respectively.

Typically, drive systems measure the commutation period, that is, the interval between commutation pulses, and compare it to the interval corresponding to a desired speed. However, salient pole electronically commutated motors used in refrigerator applications, such as motor 112, may have substantial asymmetry in their back EMF voltages due to the stator saliencies and the magnet segments. Such asymmetry may disrupt the servo regulation if consecutive commutation periods differ with respect to each other, causing motor speed to alternately appear to be too fast and then too slow. In a preferred embodiment of the present invention, system 100 corrects the instability associated with many speed regulation means. Speed regulation circuit 306 of ASIC 104 preferably measures the interval between every other commutation pulse and compares the measured interval to a commutation reference corresponding to the desired speed. FIG. 6(a) shows a typical commutation signal and FIG. 6(b) shows every other pulse of the commutation signal. The commutation reference signal is shown in FIG. 6(c) based on the clock signal of FIG. 6(f). It is to be understood, though, that those skilled in the art may alternately select an interval to be measured other than two commutation periods depending on the particular application.

Further, system 100 defines the difference between the measured interval and the reference as a digital velocity error. Of particular interest in the speed regulation method of system 100 is the sign, positive or negative, of the digital velocity error. A positive error indicates an underspeed condition while a negative error indicates an overspeed condition. Speed regulation circuit 306 integrates the velocity error by summing the signs of consecutive digital velocity errors. Upon each occurrence of a commutation pair, a counter measuring the period of the commutation pair is set to zero, and measurement of the period is initiated. A digital comparator matches the accumulated count to the selected reference count for the objective speed. If the accumulated count equals or exceeds the reference count (too slow of operation), a velocity error count is initiated and continued to either a maximum output count or terminated by the next commutation pair. At the occurrence of the next commutation pair, ASIC 104 resets the counter measuring the commutation pair interval to zero. If operation at too slow of a speed is observed, a counter accumulating the integrated error is incremented up one count. Conversely, if operation at too fast of a speed is observed (i.e., the accumulated count is less than the reference count) the integration counter is decremented one count. Incrementing the counter when at a maximum count is inhibited, as is decrementing the counter when at a zero count. FIG. 6(*d*) illustrates the relationship between digital velocity error and integrated error. FIG. 6(*e*) shows the counter output for measuring the pair of commutation periods with respect to the objective speed.

ASIC 104 stores the result of the velocity error counter in an output register concurrent with the incrementing or decrementing of the integrating counter. Following the storage of the velocity counter result, the velocity error counter is preset to the output of the integrated error counter. Presetting the velocity error counter facilitates the addition of the next velocity error count to the accumulated integrated error count.

The current reference command, defined as the sum of velocity and integrated error output, regulates the control current and motor 112 torque. Conversion of the current reference command to an analog signal is the next step in controlling the peak current of motor 112. By controlling peak current, system 100 controls the average current and the produced torque of motor 112. As the current reference command operates to reduce the speed error to zero, the control of the motor speed is accomplished. This conversion is effected through the pulse width modulated output signal SPOUT from ASIC 104 to the external resistor-capacitor averaging network 216. Network 216, in combination with resistors 218, 220 and 222, forms differential voltages to an internal current regulation comparator. FIG. 6(*g*) illustrates the variable duty cycle speed output signal SPOUT of the present invention.

In contrast to other systems, the present invention does not delay updating the current reference command to SPOUT from ASIC 104 to coincide with the initiation of the next D/A PWM period. Expediting implementation of a change in current reference minimizes instabilities caused by an irregular delay in servo response. This approach utilizes one half of an absolute digital comparator (A<B) (shown in FIG. 16A) which allows changes to be implemented at any point in the D/A PWM period without concern that a transition to a lower count could occur just after the target count and cause one cycle of 100% output.

With respect to FIG. 7, protective stall speed detection circuit 328 of the present invention provides under speed detection and protection. FIG. 17 shows stall speed detector 328 in greater detail.

The present invention provides optimum efficiency by operating motor 112 at a speed slightly faster than the minimum speed required to pump oil into the bearings of compressor 116. Detector 328 constantly monitors the rotor speed of motor 112 and disables motor 112 when rotor speed falls below a threshold speed. Since detector 328 compares the speed of motor 112 to a function of the commutation intervals, it also functions as stall detection circuitry.

For example, a particular application of the present invention may require motor 112 to operate at a speed of 1700 rpm. However, if motor 112 has a defined stall speed of 1650 rpm, operation is maintained within approximately 3% of the stall speed. For these reasons, system 100 provides accurate speed regulation to minimize the amount that motor 112 slows down in response to load variations. Additionally, the torque demanded by compressor 116 may instantaneously vary from negative (supporting forward rotation) to more than twice average (retarding forward rotation). Such torque variations introduce instantaneous speed variations into system 100.

With respect to FIG. 7, stall detection is shown in the form of a timing diagram. FIG. 7(*a*) illustrates the command from ASIC 104 for motor 112 to begin operating and FIG. 7(*b*) illustrates the time delay function of the stall detect circuit 328 relative to the on command. Generally, stall detection is delayed by a period of time, such as ten seconds, in order for motor 112 to achieve its minimum operating speed. A stall timer for performing the delay function is shown in FIG. 17.

Stall detection circuit 328 provides for the disabling of motor 112 in case of operation below the stall speed. Timer 332 of ASIC 104 includes a reset timer (shown in FIG. 17) for initiating restarting of motor 112 after it has been disabled for a period of time unless system 100 is manually reset. For example, ASIC 104 may initiate restart of motor 112 five minutes after it has been disabled. The on/off characteristic of stall detect circuit 328 and the reset timer is shown in FIG. 7(*f*). The time delay before ASIC 104 initiates the restarting of motor 112 is also shown in FIG. 7(*b*). Similarly, the reset timer initiates the restarting of motor 112 after it has been disabled due to an overcurrent condition.

In a preferred embodiment of the invention, ASIC 104 measures the time of one complete rotor revolution for use in determining the speed of motor 112. By doing so, ASIC 104 ignores sub-revolution speed variations and improves the accuracy of its stall speed detection. As an example, the rotor of a six-pole motor completes one revolution every 18 commutations. Thus, the revolution pulses, as shown in FIG. 7(*c*), occur every 18 commutations. A nine commutation pair counter 802 of FIG. 8B generates the revolution pulses. FIG. 7(*d*) illustrates the counting operation of stall detect circuit 328 for measuring the time of each rotor revolution for comparison with a time for revolution corresponding to a threshold speed. In order to prevent nuisance shut-downs caused by stall speed detection, stall detect circuit 328 accumulates a number of consecutive revolutions below the threshold speed before disabling motor 112. For example, ASIC 104 provides for stall detection, as shown in FIG. 7(*e*), when a revolution counter (shown in FIG. 17) accumulates at least five consecutive revolutions at speeds below the threshold speed based on the counting operation of FIG. 7(*d*).

Another protective feature incorporated in the present invention relates to stall detection. Generally, ASIC 104 provides maximum torque for starting motor 112. As described above, ASIC 104 includes circuitry for pulse width modulating the power provided to the windings of motor 112. In one preferred embodiment, ASIC 104 selects a particular duty cycle of pulse width modulation for maintaining and controlling the speed of motor 112. At start-up, though, motor 112 requires a greater torque in starting. Thus, ASIC 104 establishes a 100% duty cycle for providing maximum torque to start motor 112. During normal operation of motor 112, the duty cycle usually decreases to approximately 50% to meet the load requirement and to maintain the speed of motor 112. However, in certain situations, the load of motor 112 may continue to demand a greater torque to maintain the speed of motor 112 resulting in damage to motor 112. As a protective feature of the present invention, ASIC 104 interposes a duty cycle, such as 75%, after a predetermined period of time, such as 75 seconds. In other words, if ASIC 104 continues to provide power to motor 112 at a duty cycle greater than 75% after 75 seconds has passed, ASIC 104 automatically sets the duty cycle to 75%. A torque boost timer, shown in FIG. 17, is provided for timing the predetermined period of time. In this situation, motor 112 may not have enough torque to sustain its speed. As motor 112 slows to the threshold speed, stall detect circuit 328 causes ASIC 104 to open power switches 110 to disconnect power supply 108 from motor 112 for disabling its operation.

FIG. 15 shows a rail select circuit included in ASIC 104. As described above, gate drives 108 and power switches 110 may be embodied as an inverter bridge. Such a bridge has three upper switches and three lower switches. Each phase connects to power supply 128 through an upper switch and a lower switch. The rail select circuit selects which of the upper and lower switches is to pulse width modulate the power applied to the windings of motor 112 at a given time.

Another aspect of ASIC 104 is shown in detail in FIG. 19. FIG. 19 shows a current blanking circuit provides for differentiating between an actual overcurrent signal and a false one caused by noise in the circuit. The diode recovery current, present after one of the power switches 110 is commanded on, causes erroneous current information in the current regulation circuitry of ASIC 104 in the form of a current spike. The amplitude of this current spike can be several times higher than the current level to be regulated. Blanking ignores the erroneous current information caused by the diode recovery current.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An application specific integrated circuit (ASIC) for use with a motor for driving a component at one or more speeds, said ASIC comprising:

a fault detector for detecting overcurrent, underspeed and/or undervoltage conditions of the motor;

a protective circuit for disabling the motor in response to the detector detecting at least one of the conditions for a first period of time;

an inhibitor circuit for preventing disablement of the motor by the protective circuit during a second period of time immediately following starting of the motor;

a reset circuit for resetting the detector after a third period of time to permit enablement of the motor after disablement thereof by the protection circuit; and a timer for timing the first, second and third periods of time.

2. A system for driving a compressor of a refrigeration system comprising:

a motor having a stationary assembly and a rotatable assembly in magnetic coupling relation thereto, said stationary assembly including windings adapted to be commutated in at least one preselected sequence, said rotatable assembly being in driving relation to the compressor;

power switching devices responsive to a commutation signal for selectively connecting a power supply to the windings in the preselected sequence to produce an electromagnetic field for rotating the rotatable assembly; and an application specific integrated circuit (ASIC) providing the commutation signal for controlling commutation of the motor thereby to operate the motor at a selected speed, said ASIC comprising:

a fault detector for detecting overcurrent and/or underspeed conditions of the motor;

a protection circuit for disabling the motor in response to the detector detecting at least one of the conditions for a first period of time;

an inhibitor circuit for preventing disablement of the motor by the protective circuit during a second period of time immediately following starting of the motor;

a reset circuit for resetting the detector after a third period of time to permit enablement of the motor after disablement thereof by the protection circuit; and a timer for timing the first, second and third periods of time.

3. The system of claim 2 wherein the ASIC comprises a current sensing circuit generating an overcurrent signal when the sensed current exceeds an overcurrent reference level for at least the first period of time and wherein each of the power switching devices is nonconducting in response to the overcurrent signal to disable the motor.

4. The system of claim 3 wherein the second period of time is triggered by the energization of the windings and wherein the ASIC comprises a current blanking circuit for inhibiting the overcurrent signal during the second period of time whereby the motor is disabled in response to the overcurrent signal except during the second period of time.

5. The system of claim 4 wherein the power switching devices comprise an inverter bridge having a positive rail and a negative rail supplied by the power supply and including free-wheeling diodes each corresponding to and connected across one of the power switching devices, said rails normally carrying a diode recovery current at energization, and wherein the second period of time is greater than an interval of time corresponding to a time period during which the diode recovery current decays below a predetermined level.

6. The system of claim 3 wherein the current sensing circuit comprises a digital filter.

7. The system of claim 2 wherein the ASIC comprises a speed detector generating an underspeed signal when the detected speed of the motor is less than a predetermined stall speed for at least the first period of time and wherein each of the power switching devices is nonconducting in response to the underspeed signal to disable the motor.

8. The system of claim 7 wherein the speed detector measures an interval of time corresponding to at least one revolution of the rotatable assembly whereby the detected speed is independent of speed variations during a revolution.

9. A refrigeration system comprising:

a compressor for circulating a refrigerant through an evaporator;

a motor having a stationary assembly and a rotatable assembly in magnetic coupling relation thereto, said stationary assembly including windings adapted to be commutated in at least one preselected sequence, said rotatable assembly being in driving relation to the compressor;

power switching devices responsive to a commutation signal for selectively connecting a power supply to the windings in the preselected sequence to produce an electromagnetic field for rotating the rotatable assembly; and an application specific integrated circuit (ASIC) providing the commutation signal for controlling commutation of the motor thereby to operate the motor at a selected speed, said ASIC comprising:

a fault detector for detecting overcurrent and/or underspeed conditions of the motor;

a protection circuit for disabling the motor in response to the detector detecting at least one of the conditions for a first period of time;

an inhibitor circuit for preventing disablement of the motor by the protective circuit during a second period of time immediately following starting of the motor;

a reset circuit for resetting the detector after a third period of time to permit enablement of the motor after disablement thereof by the protection circuit; and a timer for timing the first, second and third periods of time.

10. A system for driving a rotatable component comprising:

a motor having a stationary assembly and a rotatable assembly in magnetic coupling relation thereto, said stationary assembly including windings adapted to be commutated in at least one preselected sequence, said rotatable assembly being in driving relation to the component;

power switching devices responsive to a commutation signal for selectively connecting a power supply to the windings in the preselected sequence to produce an electromagnetic field for rotating the rotatable assembly; and an application specific integrated circuit (ASIC) providing the commutation signal for controlling commutation of the motor thereby to operate the motor at a selected speed, said ASIC comprising:

a fault detector for detecting overcurrent and/or underspeed conditions of the motor;

a protection circuit for disabling the motor in response to the detector detecting at least one of the conditions for a first period of time;

an inhibitor circuit for preventing disablement of the motor by the protective circuit during a second period of time immediately following starting of the motor;

a reset circuit for resetting the detector after a third period of time to permit enablement of the motor after disablement thereof by the protection circuit; and a timer for timing the first, second and third periods of time.

11. A system for driving a rotatable component at one or more speeds comprising:

a motor having a stationary assembly and a rotatable assembly in magnetic coupling relation thereto, said stationary assembly including windings adapted to be commutated in at least one preselected sequence, said rotatable assembly being in driving relation to the component;

a speed selector for providing a speed select signal representative of a selected one of the speeds, said motor driving the compressor at a desired speed corresponding to the speed select signal;

power switching devices responsive to a commutation signal for selectively connecting a power supply to the windings in the preselected sequence to produce an electromagnetic field for rotating the rotatable assembly; and an application specific integrated circuit (ASIC) connected between the speed selector and the motor, said ASIC including a position sensor circuit providing a position signal representative of a position of the rotatable assembly and including a commutation circuit generating the commutation signal in response to the speed select signal and the position signal for controlling commutation of the motor thereby to operate the motor at the selected speed as represented by the speed select signal, said ASIC further including an undervoltage detector for detecting an undervoltage condition of the ASIC and disabling the motor in response thereto.

12. A method of protecting a motor driving a component, said motor having a stationary assembly and a rotatable assembly in magnetic coupling relation thereto, said stationary assembly including windings adapted to be commutated in at least one preselected sequence, said rotatable assembly in driving relation to the component, said system further comprising an application specific integrated circuit (ASIC) connected to the motor, said method comprising the steps of:

detecting overcurrent, underspeed and/or undervoltage conditions of the motor with the ASIC;

disabling the motor in response to the ASIC detecting at least one of the conditions for a first period of time;

preventing disablement of the motor during a second period of time immediately following starting of the motor; and resetting the ASIC for detecting overcurrent, underspeed and/or undervoltage conditions of the motor after a third period of time to permit enablement of the motor after disablement thereof.

13. A method of operating a system for driving a compressor of a refrigeration system, said system comprising a motor having a stationary assembly and a rotatable assembly in magnetic coupling relation thereto, said stationary assembly including windings adapted to be commutated in at least one preselected sequence, said rotatable assembly in driving relation to the compressor, said system further comprising an application specific integrated circuit (ASIC) connected to the motor, said method comprising the steps of:

selectively connecting a power supply to the windings in the preselected sequence with power switching devices responsive to a commutation signal to produce an electromagnetic field for rotating the rotatable assembly;

providing the commutation signal with the ASIC to control commutation of the motor thereby operating the motor at a selected speed;

detecting overcurrent, underspeed and/or undervoltage conditions of the motor with the ASIC;

disabling the motor in response to the ASIC detecting at least one of the conditions for a first period of time;

preventing disablement of the motor during a second period of time immediately following starting of the motor;

resetting the ASIC for detecting overcurrent, underspeed and/or undervoltage conditions of the motor after a third period of time to permit enablement of the motor after disablement thereof.

14. The method of claim 13 further comprising the steps of sensing current in the windings and generating an overcurrent signal when the sensed current exceeds an overcurrent reference level for at least the first period of time and wherein each of the power switching devices is nonconducting in response to the overcurrent signal to disable the motor.

15. The method of claim 14 wherein the second period of time is triggered by the energization of the windings and further comprising the step of inhibiting the overcurrent signal during the second period of time whereby the motor is disabled in response to the overcurrent signal except during the second period of time.

16. The method of claim 15 wherein the power switching devices comprise an inverter bridge having a positive rail and a negative rail supplied by the power supply and including free-wheeling diodes each corresponding to and connected across one of the power switching devices, said rails normally carrying a diode recovery current at energization, and wherein the second period of time is greater than an interval of time corresponding to a time period during which the diode recovery current decays below a predetermined level.

17. The method of claim 13 further comprising the steps of detecting the speed of the motor and generating an underspeed signal when the detected speed of the motor is less than a predetermined stall speed for at least the first period of time and wherein each of the power switching devices is nonconducting in response to the underspeed signal to disable the motor.

18. The method of claim 17 wherein the speed detecting step includes measuring an interval of time corresponding to at least one revolution of the rotatable assembly whereby the detected speed is independent of speed variations during a revolution.

19. A method of operating a refrigeration system, said refrigeration system having a compressor for circulating refrigerant through an evaporator and a motor for driving the compressor, said motor having a stationary assembly and a rotatable assembly in magnetic coupling relation thereto, said stationary assembly including windings adapted to be commutated in at least one preselected sequence, said rotatable assembly in driving relation to the compressor, said system further comprising an application specific integrated circuit (ASIC) connected to the motor, said method comprising the steps of:

selectively connecting a power supply to the windings in the preselected sequence with power switching devices responsive to a commutation signal to produce an electromagnetic field for rotating the rotatable assembly;

providing the commutation signal with the ASIC to control commutation of the motor thereby operating the motor at a selected speed;

detecting overcurrent, underspeed and/or undervoltage conditions of the motor with the ASIC;

disabling the motor in response to the ASIC detecting at least one of the conditions for a first period of time;

preventing disablement of the motor during a second period of time immediately following starting of the motor;

resetting the ASIC for detecting overcurrent, underspeed and/or undervoltage conditions of the motor after a third period of time to permit enablement of the motor after disablement thereof.

20. A method of operating a system for driving a rotatable component, said system comprising a motor having a stationary assembly and a rotatable assembly in magnetic coupling relation thereto, said stationary assembly including windings adapted to be commutated in at least one preselected sequence, said rotatable assembly in driving relation to the component, said system further comprising an application specific integrated circuit (ASIC) connected to the motor, said method comprising the steps of:

selectively connecting a power supply to the windings in the preselected sequence with power switching devices responsive to a commutation signal to produce an electromagnetic field for rotating the rotatable assembly;

providing the commutation signal with the ASIC to control commutation of the motor thereby operating the motor at a selected speed;

detecting overcurrent, underspeed and/or undervoltage conditions of the motor with the ASIC;

disabling the motor in response to the ASIC detecting at least one of the conditions for a first period of time;

preventing disablement of the motor during a second period of time immediately following starting of the motor;

resetting the ASIC for detecting overcurrent, underspeed and/or undervoltage conditions of the motor after a third period of time to permit enablement of the motor after disablement thereof.

21. A method of operating a system for driving a rotatable component at one or more speeds, said system comprising a motor having a stationary assembly and a rotatable assembly in magnetic coupling relation thereto, said stationary assembly including windings adapted to be commutated in at least one preselected sequence, said rotatable assembly in driving relation to the component, said system further comprising an application specific integrated circuit (ASIC) connected to the motor, said method comprising the steps of:

providing a speed select signal representative of a selected one of the speeds, said motor driving the compressor at a desired speed corresponding to the speed select signal;

providing a position signal representative of a position of the rotatable assembly;

inputting the speed select signal and the position signal to the ASIC;

generating a commutation signal via the ASIC in response to the speed select signal and the position signal for controlling commutation of the motor thereby to operate the motor at the selected speed as represented by the speed select signal;

selectively connecting a power supply to the windings in the preselected sequence with power switching devices responsive to the commutation signal to produce an electromagnetic field for rotating the rotatable assembly;

detecting an undervoltage condition of the ASIC; and disabling the motor in response to the detected undervoltage condition.

\* \* \* \* \*